United States Patent
Yamaoka et al.

(10) Patent No.: US 9,071,955 B2
(45) Date of Patent: Jun. 30, 2015

(54) COMMUNICATION DEVICE AND COMMUNICATION METHOD

(75) Inventors: Masaru Yamaoka, Osaka (JP);
Michihiro Matsumoto, Kyoto (JP);
Tomoaki Ohira, Cupertino, CA (US);
Toshiaki Ohnishi, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 212 days.

(21) Appl. No.: 13/575,374

(22) PCT Filed: Nov. 30, 2011

(86) PCT No.: PCT/JP2011/006712
§ 371 (c)(1),
(2), (4) Date: Jul. 26, 2012

(87) PCT Pub. No.: WO2012/073512
PCT Pub. Date: Jun. 7, 2012

(65) Prior Publication Data
US 2012/0302166 A1 Nov. 29, 2012

(30) Foreign Application Priority Data
Nov. 30, 2010 (JP) .................................. 2010-267728

(51) Int. Cl.
*H04B 5/00* (2006.01)
*H04W 8/22* (2009.01)
*H04W 88/02* (2009.01)

(52) U.S. Cl.
CPC .............. *H04W 8/22* (2013.01); *H04W 88/02* (2013.01); *H04B 5/0031* (2013.01); *H04B 5/0081* (2013.01)

(58) Field of Classification Search
CPC ...................................................... H04W 88/02
USPC ......................................... 455/39, 41.1–41.3
See application file for complete search history.

(56) References Cited

U.S. PATENT DOCUMENTS

| 8,406,253 B2 | 3/2013 | Kato et al. |
| 8,560,012 B2 | 10/2013 | Ohnishi et al. |

(Continued)

FOREIGN PATENT DOCUMENTS

| JP | 2002-334306 | 11/2002 |
| JP | 2003-174965 | 6/2003 |

(Continued)

OTHER PUBLICATIONS

International Search Report issued Jan. 31, 2012 in corresponding International Application No. PCT/JP2011/006712.

(Continued)

*Primary Examiner* — Tuan H Nguyen
(74) *Attorney, Agent, or Firm* — Wenderoth, Lind & Ponack, L.L.P.

(57) ABSTRACT

A terminal apparatus that communicates with a mobile apparatus includes a near-field communication unit that receives time-of-day information from the mobile apparatus through near-field communication, a use history information generation unit that extracts operation information of the terminal apparatus, and generates use history information on the basis of the time-of-day information received by the near-field communication unit, the use history information including time-of-day information associated with the detected operation information and indicating the time of day at which the corresponding operation was performed, and a main memory that stores the generated use history information.

11 Claims, 18 Drawing Sheets

(56) References Cited

U.S. PATENT DOCUMENTS

| | | |
|---|---|---|
| 8,627,075 B2 | 1/2014 | Ikeda et al. |
| 2009/0052348 A1 | 2/2009 | Kato et al. |
| 2010/0159835 A1* | 6/2010 | Aoki et al. ............... 455/41.3 |
| 2011/0007901 A1 | 1/2011 | Ikeda et al. |
| 2012/0019674 A1 | 1/2012 | Ohnishi et al. |
| 2014/0105397 A1 | 4/2014 | Ikeda et al. |

FOREIGN PATENT DOCUMENTS

| | | |
|---|---|---|
| JP | 2005-284512 | 10/2005 |
| JP | 2008-37536 | 2/2008 |
| JP | 2009-135865 | 6/2009 |
| WO | 2010/073732 | 7/2010 |

OTHER PUBLICATIONS

Extended European Search Report issued Apr. 23, 2015 in corresponding European Application No. 11844814.1.

* cited by examiner

FIG. 9

Collected history information

00:00:00  Near-field communication established
00:00:01  Start rice cooking
00:00:15  Start heating
00:01:15  40°C (Low heat)
00:03:22  88°C (Low heat)
00:20:00  92°C (Medium heat)
00:25:12  98°C (High heat)
00:32:00  Stop heating
00:35:00  Finish cooking

801

Generated history information

Date: 2010/11/8 (mon)
User: Hanako (id:XX01234)

PM 04:23:13  Near-field communication established
PM 04:23:14  Start rice cooking
PM 04:23:29  Start heating
PM 04:24:29  40°C (Low heat)
PM 04:26:35  88°C (Low heat)
PM 04:43:13  92°C (Medium heat)
PM 04:48:25  98°C (High heat)
PM 04:55:13  Stop heating
PM 04:58:13  Finish cooking

802

COMMUNICATION DEVICE AND COMMUNICATION METHOD

TECHNICAL FIELD

The present invention relates to a communication device and a communication method for performing near-field communication with a reader-writer apparatus.

BACKGROUND ART

A technique to manage validity of an IC card is known, for example as disclosed in PTL 1. According to this technique, a near-field communication unit and a radio-controlled clock are provided in the IC card. The IC card induces a power source from the radiowave received through near-field communication, and acquires a time of day from the radio-controlled clock utilizing the power source, to thereby manage the validity of the IC card.

Such a configuration allows the radio-controlled clock to be driven without additionally providing a power source for driving the radio-controlled clock.

In addition, a technique to measure a transport and storage status of an article by using a contactless electronic tag has been disclosed, for example in PTL 2. In this case, a contactless electronic tag, not provided with a battery, is attached to each article to be transported and stored. A sensor, a control apparatus, and a communication device are connected so as to constitute an environment recording apparatus.

The environment recording apparatus measures temperature and humidity with the sensor to acquire an environment measurement value, and then writes the environment measurement value in the contactless electronic tag located within the communication range of the communication device. The environment recording apparatus further includes a radio-controlled clock unit and a GPS receiver, and stores time-of-day information and position information in the contactless electronic tag, in addition to the environment measurement value.

With the foregoing technique, the environment information, the time-of-day information, and the position information can be stored in the contactless electronic tag, in the transport and storage of chemicals, perishable foods, and the like.

CITATION LIST

Patent Literature

[PTL 1] Japanese Unexamined Patent Application Publication No. 2005-284512
[PTL 2] Japanese Unexamined Patent Application Publication No. 2008-37536

SUMMARY OF INVENTION

Technical Problem

In both of the foregoing techniques, however, the radio-controlled clock is employed for acquiring the time of day. Since the radio-controlled clock is designed to receive the radiowave of a frequency different from that of an RFID and the contactless electronic tag, an antenna compatible with the radio-controlled clock has to be additionally provided.

In addition, with the technique according to PTL 2, although the contactless electronic tag in which the environment data is accumulated is not provided with a battery, a power source for activating the radio-controlled clock and the GPS has to be additionally provided, in order to acquire the time-of-day information and the position information.

The present invention has been accomplished in view of the foregoing problems, and provides a communication device and a communication method that enables use history information containing time-of-day information to be generated despite not having a clock device.

Solution to Problem

To achieve the foregoing object, an aspect of the present invention provides a communication device that communicates with an external reader-writer apparatus. The communication device includes a near-field communication unit configured to receive time-of-day information from the reader-writer apparatus through near-field communication; a use history information generation unit configured to detect operation information of the communication device, and generate use history information on the basis of the time-of-day information received by the near-field communication unit, the use history information including time-of-day information associated with the detected operation information and indicating the time of day at which the corresponding operation was performed; and a storage unit configured to store the use history information generated by the use history information generation unit.

Advantageous Effects of Invention

Such a configuration enables the use history information containing the time-of-day information to be generated despite not having a clock device.

BRIEF DESCRIPTION OF DRAWINGS

FIG. 9 is a schematic drawing for explaining history information collected by the terminal apparatus according to the embodiment 1.

DESCRIPTION OF EMBODIMENTS

Figure 1:
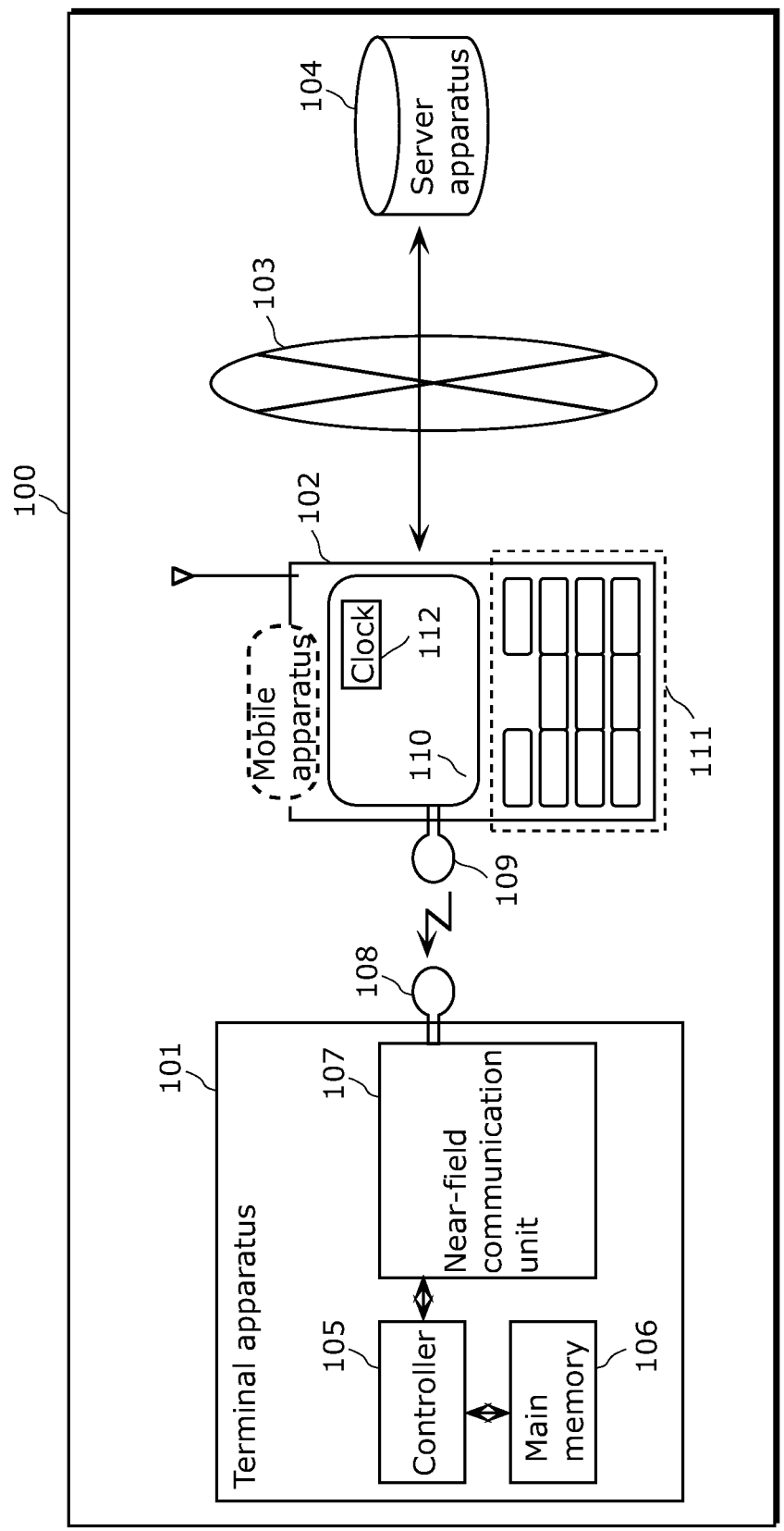
FIG. 1 is a block diagram showing a system configuration according to an embodiment 1 of the present invention.

A communication device according to an embodiment of the present invention includes a near-field communication unit configured to receive time-of-day information from an external reader-writer apparatus through near-field communication, a use history information generation unit configured to detect operation information of the communication device and generate use history information on the basis of the time-of-day information received by the near-field communication unit, the use history information including time-of-day information associated with the detected operation information and indicating the time of day at which the corresponding operation was performed, and a storage unit configured to store the use history information generated by the use history information generation unit.

The communication device thus configured recognizes the time-of-day information through the near-field communication, and therefore the communication device can generate, despite not having a clock device, the use history information containing the time-of-day information.

The communication device according to the embodiment of the present invention may transmit the use history information stored in the storage unit to the external reader-writer apparatus, in response to an acquisition request from the external reader-writer apparatus.

In this case, transmitting the use history information containing the time-of-day information to a server apparatus through the reader-writer apparatus thereby managing the use history information by the server apparatus enables the user's life pattern and a time zone of use to be extracted, thereby allowing provision of a service that closely fits the user's life pattern.

The following embodiments are examples of the present invention. Constituents, relationships therebetween, methods, and sequences thereof described in the embodiments are merely exemplary, and in no way limit the present invention.

The present invention is limited solely by the appended claims. Therefore, the constituents described in the embodiments but not set forth in independent claims representing the most superordinate concept of the present invention are to be construed as examples of the present invention that are not mandatory for achieving the foregoing object of the present invention.

Hereafter, the embodiments of the present invention will be described referring to the drawings.

Embodiment 1

FIG. 1 is a block diagram showing a system configuration according to this embodiment.

The system 100 includes a terminal apparatus 101, a mobile apparatus 102, and a server apparatus 104.

The mobile apparatus 102 and the server apparatus 104 are each connected to a mobile phone network through Internet 103.

In this embodiment, the terminal apparatus 101 exemplifies a home electric appliance. Specific examples of the home electric appliance include audio-visual apparatuses such as a TV set and a digital recorder, daily-life appliances such as a refrigerator, a washing machine, an air conditioner, a rice cooker, and a cleaner, healthcare appliances such as a toothbrush, a blood pressure meter, and a body composition meter, and, further, beauty instruments such as a hair dryer and a shaver.

[Terminal Apparatus 101]

As shown in FIG. 1, the terminal apparatus 101 includes a controller 105, a main memory 106, a near-field communication unit 107, and a loop antenna 108.

The controller 105 is a CPU or a microcomputer that manages the system of the terminal apparatus 101, and controls the terminal apparatus 101. The controller 105 may also have a function to generate history information representing the operation history of the terminal apparatus 101.

The main memory 106 may be a read-only memory (ROM) including firmware to manage the operation of the terminal apparatus 101, or a random-access memory (RAM) in which operation status information (such as operation history information) generated by the controller 105 is stored. The main memory 106 can be accessed by the controller 105. The controller 105 manages the operation of the terminal apparatus 101 in accordance with a control program such as the firmware contained in the ROM, and accumulates the operation status information of the terminal apparatus 101 in the main memory 106.

The near-field communication unit 107 controls the near-field communication performed by the terminal apparatus 101.

For the near-field communication according to this embodiment, a frequency of the HF band (around 13.56 MHz, ISO/IEC14443). This is the same band as the near-field communication (NFC) and the radio frequency identification (RFID), which are world-wide standards. Alternatively, a frequency of the UHF band (300 MHz to 3 GHz) may be employed for the near-field communication according to this embodiment.

The near-field communication unit 107 generates a power source for driving itself from a radiowave from an external reader-writer, even when the power of the terminal apparatus 101 is not turned on.

The near-field communication unit 107 communicates with the controller 105 through a serial connection.

The controller 105 transmits the information stored in the main memory 106 to outside of the terminal apparatus 101, through the near-field communication unit 107.

The controller 105 rewrites the information in the main memory 106, in accordance with a command received from outside of the terminal apparatus 101 through the near-field communication unit 107.

The loop antenna 108 is connected to the near-field communication unit 107, and serves for the communication with the external reader-writer apparatus.

[Mobile Apparatus 102]

The mobile apparatus 102 includes a loop antenna 109 for performing the near-field communication with the terminal apparatus 101, and communicates with the terminal apparatus 101 through the near-field communication unit 107. The mobile apparatus 102 can be exemplified by a mobile terminal such as a mobile phone, a mobile TV, or a PDA.

In the case where the near-field communication unit 107 of the terminal apparatus 101 is configured to perform the FeliCa communication, the mobile apparatus 102 may be a commercially available wallet mobile phone.

The mobile apparatus 102 includes a display unit 110 including an LCD panel for example, and an operation section 111 through which an input by the user is accepted.

The mobile apparatus 102 includes a clock device 112, with which information about time and date is managed.

The mobile apparatus 102 is capable of accepting various additional applications through the mobile network.

Here, a process will be described through which the mobile apparatus 102 acquires, upon activating a predetermined application, terminal apparatus information from the terminal apparatus 101 through the near-field communication, and transmits the acquired terminal apparatus information to the server apparatus 104.

First, when the predetermined application is activated the mobile apparatus 102 outputs a polling signal through the loop antenna 109.

The terminal apparatus 101 transmits a polling response upon receipt of the polling signal outputted from the mobile apparatus 102.

Accordingly, the mobile apparatus 102 receives the polling response transmitted from the terminal apparatus 101.

At this stage, the near-field communication between the mobile apparatus 102 and the terminal apparatus 101 is established.

In this process, the mobile apparatus 102 does not have to keep outputting the polling signal when it is not necessary to perform the near-field communication. Such an arrangement contributes to reducing the power consumption of the mobile apparatus 102.

Through the near-field communication established between the mobile apparatus 102 and the terminal apparatus 101, the mobile apparatus 102 then requests the terminal apparatus 101 for the terminal apparatus information stored in the main memory 106 of the terminal apparatus 101. Upon receipt of the request, the terminal apparatus 101 transmits the requested terminal apparatus information to the mobile apparatus 102.

The terminal apparatus information includes the address of the connected server, and the mobile apparatus 102 is connected to the server apparatus 104 designated by that address through the mobile network or Internet 103. Then the mobile apparatus 102 transmits the acquired terminal apparatus information to the server apparatus 104.

[Server Apparatus 104]

The server apparatus 104 includes a popular WEB server. The server apparatus 104 includes a database. The server apparatus 104 may be composed of a plurality of servers.

Upon receipt of the terminal apparatus information from the mobile apparatus 102, the server apparatus 104 stores the received terminal apparatus information in the internal database. The server apparatus 104 also generates information related to the terminal apparatus information, or user interface information that allows the user to operate the terminal apparatus 101.

Then the server apparatus 104 transmits the information generated as above to the mobile apparatus 102. The mobile apparatus 102 displays the information received from the server apparatus 104 on the display unit 110 through the browser.

Thus, according to this embodiment, the operation status information stored in the main memory 106 of the terminal apparatus 101, such as the use history, is transmitted as the terminal apparatus information to the server apparatus 104 through the mobile apparatus 102.

Transmitting the use history information of the terminal apparatus 101 to the server apparatus 104, thereby collecting the terminal apparatus information including the use history information in the server apparatus 104, enables functions of the terminal apparatus 101 actually utilized by the user, as well as the user's life pattern such as in which time zone the user utilizes the terminal apparatus, to be surmised.

Consequently, the foregoing arrangement facilitates appropriate forthcoming merchandise planning and high-level customer support to be realized, thus to gain higher customer satisfaction.

Figure 2:
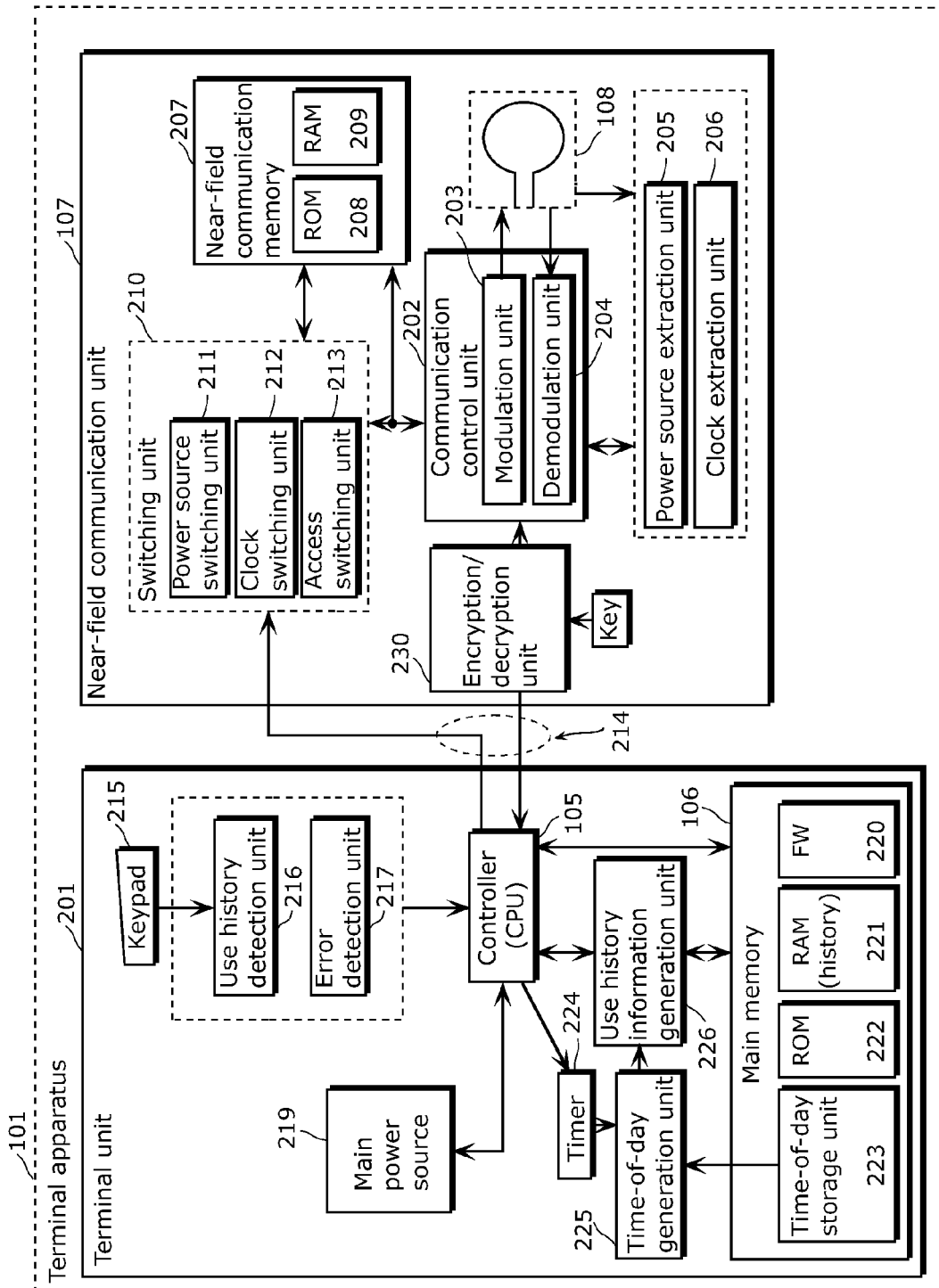
FIG. 2 is a block diagram showing a configuration of a terminal apparatus according to the embodiment 1.

FIG. 2 is a block diagram showing a configuration of the terminal apparatus 101 according to this embodiment.

The terminal apparatus 101 according to this embodiment includes the near-field communication unit 107 and a terminal unit 201.

[Near-Field Communication Unit 107]

The near-field communication unit 107 performs the near-field communication with the mobile apparatus 102 (see FIG. 1), which is an external apparatus to the terminal apparatus 101. The near-field communication unit 107 includes the loop antenna 108, a communication control unit 202, a power source extraction unit 205, a clock extraction unit 206, a near-field communication memory 207, an encryption/decryption unit 230, and a switching unit 210.

The loop antenna 108 serves for reception of radiowave outputted from the reader-writer of the mobile apparatus 102 external to the terminal apparatus 101. The mobile apparatus 102 is brought into the range in which the loop antenna 108 can receive the radiowave from the reader-writer, or into touch therewith. The loop antenna 108 may be attached to an upper portion or a lateral portion of the casing of the terminal apparatus 101.

The communication control unit 202 includes a modulation unit 203 and a demodulation unit 204.

The modulation unit 203 modulates or encodes a signal when information is transmitted to the external reader-writer apparatus through the near-field communication. Here, for example, the Manchester protocol or NRZ protocol is employed for the encoding, and the amplitude shift keying (ASK) is employed for the modulation.

The encoded/modulated signal is outputted to the loop antenna 109 of the mobile apparatus 102 through the loop antenna 108.

The demodulation unit 204 demodulates the signal received from the external reader-writer. Upon receipt of the signal transmitted from the external reader-writer through the loop antenna 108, the demodulation unit 204 demodulates the signal and outputs the demodulated signal to the encryption/decryption unit 230.

The encryption/decryption unit 230 encrypts the terminal apparatus information outputted outward from the near-field communication unit 107, and decrypts the received signal demodulated by the demodulation unit 204.

For the encryption and decryption, a common key cryptosystem and a public key cryptosystem may be employed.

In the case of employing the common key cryptosystem, a secret key is inserted in the near-field communication unit 107, and the secret key is utilized for encrypting data to be transmitted and decrypting received data. In the case of employing the public key cryptosystem, the public key is utilized for encrypting the data to be transmitted and the secret key is utilized for decrypting received data.

In either case, accordingly, it is necessary to manage the secret key so as not to be disclosed outside of the near-field communication unit 107.

The encryption/decryption unit 230 also verifies whether the transmitted data has been falsified on the near-field communication path, and generates a falsification prevention code and adds the code to the data to be transmitted. The falsification prevention code may be generated in the form of a popular message authentication code (MAC), with a secret key different from or the same as the secret key for the encryption/decryption.

The data to be transmitted encrypted by the encryption/decryption unit 230 is generated by encrypting the content in the near-field communication memory 207 of the near-field communication unit 107 or in the main memory 106. The received and decrypted information is also stored in the near-field communication memory 207 or in the main memory 106.

The power source extraction unit 205 induces, upon receipt of a signal transmitted from the reader-writer external to the terminal apparatus 101 through the loop antenna 108, a power source for driving at least the near-field communication unit 107, from the received signal.

The power source extraction unit 205 induces power from the alternating field of the signal outputted by the external reader-writer. The root mean square of the operating field of the near-field communication unit 107 is approx. 1.5 A/m at minimum and approx. 7.5 A/m at maximum. Accordingly, the power generated by the power source extraction unit 205 fluctuates depending on the reception status of the radiowave from the reader-writer. Therefore, a voltage regulator that keeps the voltage constant is incorporated in the terminal apparatus 101 as a part of the power source extraction unit 205. The voltage regulator serves, for example, to convert surplus power into heat when the power is generated in excess.

The clock extraction unit 206 extracts, like the power source extraction unit 205, a clock signal for activating at least the near-field communication unit 107 from the radiowave outputted from the reader-writer.

The near-field communication memory 207 is provided in the near-field communication unit 107 of the terminal apparatus 101. The near-field communication memory 207 includes a ROM region 208 and a RAM region 209.

In the ROM region 208, inherent ID information for identifying the terminal apparatus 101, model information indicating the type of the terminal apparatus 101, and the address information of the server apparatus 104 are recorded in the manufacturing process of the terminal apparatus 101.

The RAM region 209 is utilized as a buffer memory for outputting the received data decrypted by the encryption/decryption unit 230 to the terminal apparatus 101, and a temporary memory for outputting the information in the main memory 106 of the terminal apparatus 101 to the reader-writer.

The near-field communication memory 207 is capable of outputting the content in response to a request from the external reader-writer and storing information received therefrom, not only when the power of the terminal apparatus 101 is turned on, but also when the power of the terminal apparatus 101 is off or when the terminal apparatus 101 is disconnected from an electrical outlet. This is because the near-field communication memory 207 is configured to be driven by the power extracted by the power source extraction unit 205.

On the other hand, the data in the main memory 106 cannot be read when the power of the terminal apparatus 101 is off. This is because the main memory 106 is driven exclusively by the main power source of the terminal unit 201. In other words, the main memory 106 can only operate when the terminal apparatus 101 is connected to an electrical outlet and power from the electrical outlet is being supplied to the terminal apparatus 101.

The switching unit 210 includes a power source switching unit 211, a clock switching unit 212, and an access switching unit 213.

The power source switching unit 211 switches the power source for driving the near-field communication unit 107.

The power source switching unit 211 switches the power source for driving the near-field communication unit 107 between the power induced by the power source extraction unit 205 and the power supplied by the main power source 219 of the terminal unit 201. The switching between the two power sources is performed in accordance with a control signal from the controller 105 of the terminal unit 201.

For example, when the terminal unit 201 makes access to the near-field communication memory 207, the controller 105 outputs a switching signal to the power source switching unit 211. Upon receipt of the switching signal, the power source switching unit 211 switches the power source for driving the near-field communication unit 107 from the power induced by the power source extraction unit 205 to the main power source 219.

However, in the case where the communication control unit 202 is already communicating with the near-field communication memory 207 when the switching signal is outputted, the power source switching unit 211 does not switch the power source until the communication is finished, despite the controller 105 having outputted the switching signal.

Conversely, while the controller 105 is communicating with the near-field communication memory 207, in other words while the controller 105 is outputting the switching signal to the power source switching unit 211, the communication control unit 202 is restricted from making access to the near-field communication memory.

Such an arrangement prevents the communication control unit 202 and the controller 105 from simultaneously making access to the near-field communication memory 207 and causing a conflict.

The clock switching unit 212 switches, like the power source switching unit 211, the clock signal for making access to the near-field communication memory 207. More specifically, the clock switching unit 212 switches between the clock signal extracted by the clock extraction unit 206 and the clock signal supplied from the terminal unit 201. In addition, as the case of the power source switching unit 211, the control for preventing the conflict with respect to the near-field communication memory 207 is performed.

The access switching unit 213 controls the switching action of the power source switching unit 211 and the clock switching unit 212, between the respective power sources and clocks. The access switching unit 213 performs the control for preventing the aforementioned conflict.

[Terminal Unit 201]

The terminal unit 201 performs the essential function of the terminal apparatus 101 as a home electric appliance. In the case where the terminal apparatus 101 is a rice cooker for example, the terminal unit 201 constitutes a block having the rice cooking function.

The terminal unit 201 is connected to the near-field communication memory 207 through a popular serial interface such as a universal asynchronous receiver/transmitter (UART), a serial peripheral interface (SPI), or an inter-integrated circuit (I2C).

The terminal unit 201 includes the controller 105, a keypad 215, a use history detection unit 216, an error detection unit 217, the main power source 219, the main memory 106, a timer 224, a time-of-day generation unit 225, and a use history information generation unit 226.

The controller 105 is a block that controls the system of the terminal unit 201, and constituted of a CPU or a microcomputer.

The controller 105 controls the operation of the terminal unit 201 upon being loaded with the firmware or control program stored in a firmware (FW) 220 of the main memory 106.

The keypad 215 is an input unit through which an inputting operation of the user is received. The keypad 215 is constituted of buttons or a touch panel. In the case of a rice cooker for example, the rice cooking start button and operational keys, such as one for reservation timer setting, correspond to the keypad 215.

The use history detection unit 216 generates use history information following the operation through the keypad 215. More specifically, each time the user operates the keypad 215, the use history detection unit 216 generates information for identifying the user's operation and outputs such information to the controller 105.

In addition, the use history detection unit 216 generates information for identifying the operational status (state transition) of the terminal unit 201, in addition to the operation triggered by the input through the keypad 215.

Accordingly, the use history detection unit 216 generates the use history information each time the operational status of the terminal unit 201 is switched from one to another such as, in the case of a rice cooker, from heating to steaming, and further to retaining warmth, in addition to each time the user presses the rice cooking start button.

The error detection unit 217 detects a malfunction taking place in the terminal unit 201. The error detection unit 217 then generates information for identifying the malfunction and outputs such information to the controller 105. The error detection unit 217 detects, for example, lack of a part to be attached, replacement time of an expendable part, erroneous operation by the user, abnormal resetting of the system, and so forth, and generates the information for identifying such malfunctions.

The main power source 219 is a widely known power source. The main power source 219 drives at least the terminal unit 201. The configuration of the main power source 219 differs depending on the type of the terminal apparatus 101, and the power may be supplied directly from an electrical outlet, or from a battery.

The main memory 106 is the primary storage unit of the terminal unit 201, and includes the FW 220, a RAM (history region) 221, a ROM 222, and a time-of-day storage unit 223.

The FW 220 is a region in which the firmware or control program that defines the operation of the controller 105 is stored. The FW 220 is recorded in the manufacturing process of the terminal apparatus 101.

The RAM (history region) 221 is a memory for storing the use history information generated by the use history information generation unit 226 on the basis of the operation detected by the use history detection unit 216 and the error detected by the error detection unit 217, and can be rewritten by the controller 105.

The ROM 222 is a popular read-only memory from which the controller 105 can only read out information, in which a portion of the firmware or control program recorded in the FW 220 that does not have to be rewritten is stored.

The time-of-day storage unit 223 stores therein the time-of-day information. The signal transmitted from the external reader-writer is received by the near-field communication unit 107, and the time-of-day information included in the received signal is extracted. The time-of-day information thus extracted is stored in the time-of-day storage unit 223.

The time-of-day information generated by the mobile apparatus 102 is inputted to the time-of-day storage unit 223. The time of day indicated by the time-of-day information corresponds to the time of day at which the communication between the mobile apparatus 102 including the reader-writer and the near-field communication unit 107 is established.

To establish the communication, first a polling signal outputted by the mobile apparatus 102 once an application of the mobile apparatus 102 is activated is received by the near-field communication unit 107.

The near-field communication unit 107 then outputs a polling response to the mobile apparatus 102, in response to the polling signal.

When the mobile apparatus 102 receives the polling response, the near-field communication is established between the mobile apparatus 102 and the near-field communication unit 107.

The mobile apparatus 102 extracts the time of day at which the near-field communication was established, from the clock device 112 (see FIG. 1) provided in the mobile apparatus 102. Then the mobile apparatus 102 outputs the extracted time of day to the near-field communication unit 107 through the near-field communication. The time-of-day information is received by the near-field communication unit 107, transmitted to the terminal unit 201 through a serial interface 214, and then stored by the controller 105 in the time-of-day storage unit 223 of the main memory 106.

The timer 224 is a popular timer that can only measure the elapsed time, which is unable to extract absolute time-of-day information. The timer 224 is driven by the power supplied by the main power source 219.

The timer 224 works in conjunction with the time-of-day storage unit 223 of the main memory 106. More specifically, the timer 224 is activated at the time that the time-of-day information is stored in the time-of-day storage unit 223 through the near-field communication. Here, "activated" means that the timer starts to measure the elapsed time.

The timer 224 can keep measuring the time while receiving power from the main power source. Accordingly, the timer 224 resets the time count to zero once the time of day is set in the time-of-day storage unit 223.

The time-of-day generation unit 225 adds the elapsed-time information generated by the timer 224 to the time-of-day information stored in the time-of-day storage unit 223 of the main memory 106, to thereby calculate the current time of day.

In this embodiment, the time-of-day generation unit 225 is constituted of an adder. Here, adding the elapsed-time information to the time-of-day information means determining the time of day to be reached when the time according to the elapsed-time information passes after the time of day indicated by the time-of-day information.

The use history information generation unit 226 generates the use history information containing the time-of-day information, on the basis of the time-of-day information generated by the time-of-day generation unit 225 and the information for identifying the operation and error detected by the use history detection unit 216 and the error detection unit 217, respectively. The use history information generation unit 226 then stores the generated use history information in the RAM (history region) 221 of the main memory 106.

More specifically, the use history detection unit 216 adds the elapsed time measured by the timer 224 at the time when the user's operation or state transition is detected through the use history information, or when a malfunction is detected by the error detection unit 217, to the time-of-day information stored in the time-of-day storage unit 223 of the main memory 106, in the time-of-day generation unit 225. The information obtained by this addition is outputted to the use history information generation unit 226, for example as the time of day at which the use history was detected, or the time of day at which the error was detected.

Through the foregoing process, the use history information generation unit 226 can generate the use history information containing the time-of-day information.

As described above, the terminal apparatus 101 according to this embodiment generates the time-of-day information on the basis of the time-of-day information provided from the mobile apparatus 102 through the near-field communication and the elapsed time measured by the timer 224. Such a configuration enables the history information containing the time-of-day information to be generated, despite not having a clock device.

In general, to extract the absolute time of day, a clock device supported by a sub power source such as a battery, or a radio-controlled clock device capable of receiving the time-of-day information from a wide-area radiowave has to be provided, in order to be able to keep operating even without the supply of power from the main power source (main power source 219).

However, since both of such clock devices are expensive, only limited home electric appliances can be incorporated with such clock devices.

On the other hand, the timer 224 is less expensive than the clock devices cited above, and widely employed in popular home electric appliances including large-sized ones such as a washing machine and a refrigerator, as well as in small-sized ones such as a shaver and an electric toothbrush.

Therefore, utilizing the inexpensive timer 224 to generate the history information of the terminal apparatus 101 contributes to reducing the manufacturing cost, compared with the case of employing the clock device.

In addition, employing the timer 224 enables the history information containing the time of day to be generated without the need to additionally provide an antenna or a power source, thereby allowing the configuration of the terminal apparatus 101 to be simplified.

For example, the mobile apparatus 102 may be configured to read out the use history information containing the time-of-day information through the near-field communication, and transmit such information to the server apparatus 104. Accumulating thus the use history information in the server apparatus 104 allows when and how the user utilizes the terminal apparatus 101 to be surmised. Consequently, an optimum service that closely fits the user's life pattern can be provided.

The timer 224, the time-of-day generation unit 225, and the use history information generation unit 226 according to this embodiment may be integrally composed into a unified part. In this case, since the initial value of the timer 224 corresponds to the time-of-day information stored in the time-of-day storage unit 223, the timer can be activated on the basis of the provided time-of-day information, and hence the time-of-day storage unit 223 may be excluded.

Now, an operation process of the terminal apparatus 101, the mobile apparatus 102, and the server apparatus 104 configured as above will be described hereunder, referring to the drawings.

[Sequence]

FIGS. 3 to 6 are sequence charts showing the operation process of the terminal unit 201 and the near-field communication unit 107 of the terminal apparatus 101, the mobile apparatus 102, and the server apparatus 104, respectively constituting the system according to this embodiment.

In this embodiment, the terminal apparatus 101 is exemplified by a rice cooker and the mobile apparatus 102 is exemplified by a mobile phone.

Accordingly, the mobile apparatus 102 instructs the rice cooking operation to the terminal apparatus 101, and transmits the use history information containing the time-of-day information to the server apparatus 104. In addition, it will be assumed that the mobile apparatus 102 is configured to announce the rice cooking completion time. The sequence of the operation of the mobile apparatus 102 is based on the operation sequence specified in the application installed in the mobile phone exemplifying the mobile apparatus 102.

Figure 3:
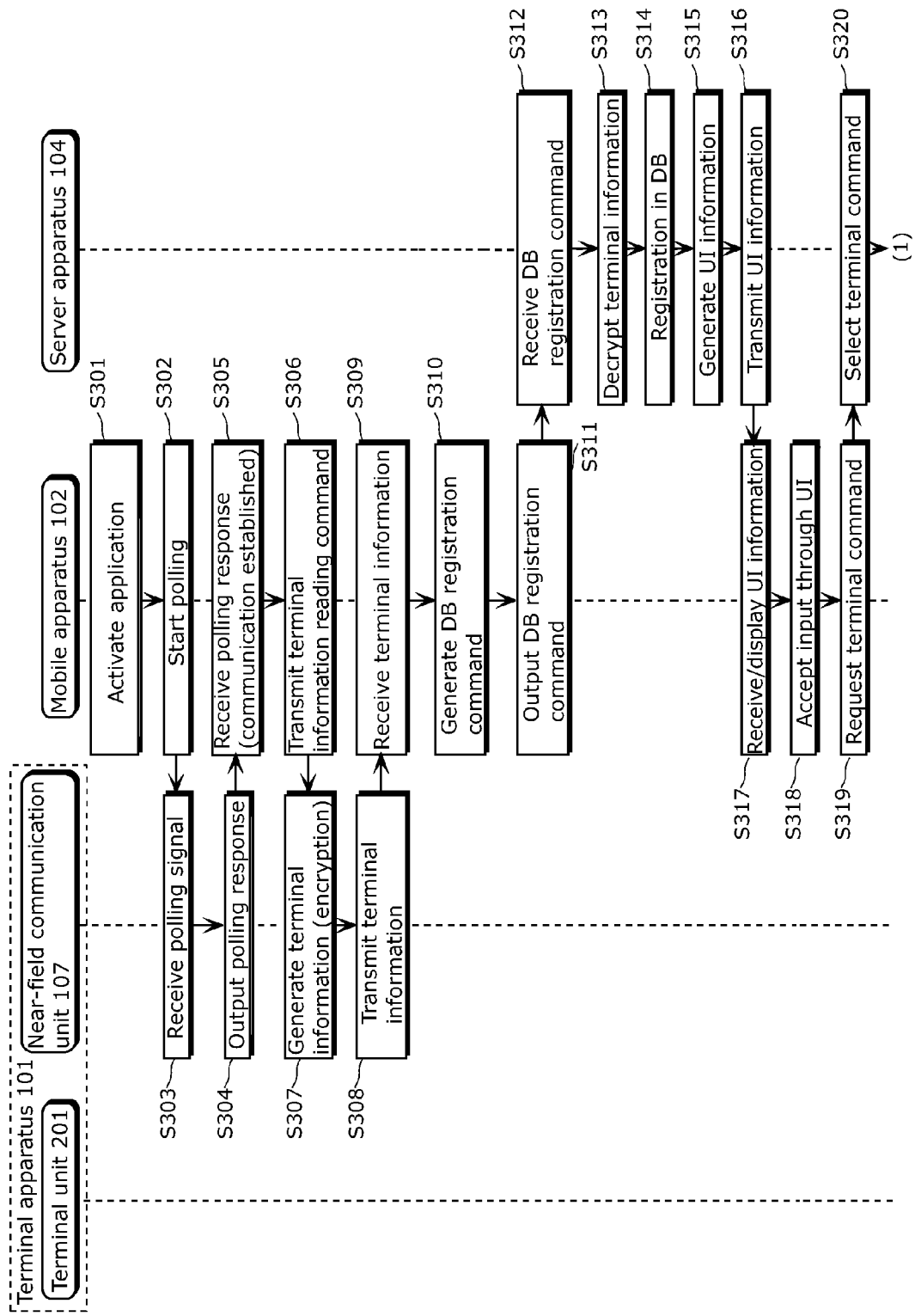
FIG. 3 is a sequence chart showing an operation of the system according to the embodiment 1.

FIG. 3 illustrates the sequence from the point where the mobile apparatus 102 activates the application to the point where the server apparatus 104 selects a terminal command.

First, the mobile apparatus 102 accepts an activation instruction of the application made by the use, and activates the application designated by the activation instruction (S301).

The application now activated turns on the near-field communication module of the mobile apparatus 102, so as to output a polling signal (S302).

Here, the polling refers to an operation of continuously transmitting a command requesting for establishment of communication to unspecified RF modules at regular time intervals.

The near-field communication unit 107 of the terminal apparatus 101 receives the polling signal outputted at S302 (S303).

The near-field communication unit 107 examines whether the received polling signal is a communication request command addressed to itself (the near-field communication unit 107 itself).

Such examination is performed on the basis of a system identifier or an application identifier included in the polling signal.

Upon receipt of the polling signal, the near-field communication unit 107 also drives itself with the power source and the clock signal extracted by the internal power source extraction unit 205 and the clock extraction unit 206, respectively.

In the case where the near-field communication unit 107 decides that the polling signal is a communication request addressed thereto at S303, the near-field communication unit 107 transmits a polling response signal to the mobile apparatus 102 that has transmitted the polling signal (S304).

The polling response signal bears ID information for identifying the relevant near-field communication unit 107.

When the near-field communication unit 107 outputs the polling response at S304, the mobile apparatus 102 receives the polling response. At this point, the connection between the mobile apparatus 102 and the near-field communication unit 107 for the near-field communication is established (S305).

At the moment that the connection between the mobile apparatus 102 and the near-field communication unit 107 of the terminal apparatus 101 for the near-field communication is established at S305, the mobile apparatus 102 transmits a terminal information reading command to the terminal apparatus 101 (S306).

Here, the terminal information refers to the information stored in the near-field communication memory 207 or the main memory 106 of the terminal apparatus 101. The terminal information includes, for example, a model number indicating the type of the terminal apparatus, an ID for uniquely identifying the near-field communication unit 107, the use history information and operation status information of the terminal apparatus 101.

When the terminal information reading command outputted from the mobile apparatus 102 is transmitted at S306, the near-field communication unit 107 of the terminal apparatus 101 receives the transmitted terminal information reading command. Then the terminal apparatus 101 generates the terminal apparatus information (S307).

The terminal information is generated by encrypting the model number and serial number stored in the near-field communication memory 207, the URL of the server apparatus 104, and the use history information of the terminal apparatus 101 stored in the main memory 106, with the encryption/decryption unit 230.

The terminal information generated at S307 is modulated by the modulation unit 203 of the communication control unit 202, and transmitted to the mobile apparatus 102 through the loop antenna 108 (S308).

The terminal information transmitted from the near-field communication unit 107 at S308 is received by the mobile apparatus 102 (S309). The mobile apparatus 102 extracts the server URL, which is the address of the server apparatus 104 to be connected to, out of the received terminal information.

The mobile apparatus 102 also generates a registration command for the database (DB) of the server apparatus 104, on the basis of the received terminal information (S310).

Here, the registration command is generated by matching at least a customer ID stored in the mobile apparatus 102 or the apparatus ID that allows the mobile apparatus 102 to be identified, with the received terminal information.

The mobile apparatus 102 establishes connection with the server apparatus 104 at the URL thereof extracted at S309, and transmits the DB registration command generated at S310 (S311).

The server apparatus 104 receives the DB registration command transmitted at S311 (S312).

In the case where the terminal information included in the received DB registration command is encrypted, the server apparatus 104 decrypts the terminal information (S313). This decryption corresponds to the encryption performed by the encryption/decryption unit 230 of the terminal apparatus 101. Accordingly, in the case where the secret key cryptosystem is employed, the same secret key as used by the encryption/decryption unit 230 is utilized for the decryption. In the case where the public key cryptosystem is employed, the secret key corresponding to the public key used by the encryption/decryption unit 230 is utilized for the decryption.

The terminal information decrypted at S313 is registered in the database of the server apparatus 104, together with the customer ID included in the DB registration command and the apparatus ID of the mobile apparatus (S314).

The foregoing registration may be skipped in the case where the same information as that received is already registered in the database.

In addition, the aforementioned registration procedure allows regular user registration to be automatically performed. Normally, the regular user registration is realized by managing the customer and the apparatus owned by the customer as a pair. Therefore, the regular user registration can be easily realized by registering the customer ID included in the received DB registration command and the terminal information (model number, serial number) in association with each other.

In the existing systems the user has to manually input the model number and the serial number, which makes the registration procedure troublesome and often incurs erroneous data input, and therefore it is difficult to collect a large amount of registered information.

With the arrangement according to this embodiment, however, the user can transmit the DB registration command to the server apparatus 104 simply by bringing the mobile apparatus 102 close to the terminal apparatus 101, which simplifies the registration procedure and prevents erroneous input by the user. Consequently, accurate regular user registration can be performed.

When the DB registration is completed at S314, the server apparatus 104 generates a user interface (UI) screen based on the registered terminal information (S315). More specifically, the generated UI screen displays, for example, a menu corresponding to the model number of the terminal apparatus 101. In the case where the terminal information includes information of an error actually taking place, a remedy for the error is displayed. Thus, the UI screen (see UI information subsequently described) that reflects the state of the terminal apparatus 101 represented by the received terminal information is generated.

The UI screen may be provided as a homepage based on a popular HTML format. In this case, the UI screen can be displayed on the display unit 110 of the mobile apparatus 102, utilizing a browser application installed in the mobile apparatus 102 as a standard spec.

The UI screen (UI information) generated at S315 is transmitted to the mobile apparatus 102 through the mobile phone network or Internet (S316).

The UI screen (UI information) transmitted from the server apparatus 104 at S316 is received by the mobile apparatus 102, and the received UI screen (UI screen representing the received UI information) is displayed on the display unit 110 of the mobile apparatus 102 (S317).

After the UI screen received at S317 is displayed on the display unit 110, the mobile apparatus 102 accepts an input by the user through the operation section 111 (S318). In the case where the terminal apparatus 101 is a rice cooker, the inputs to be accepted include, for example, setting of a rice cooking mode (white rice, brown rice, rice gruel, etc.), setting of the time of day for the rice cooking timer, and so forth.

When the user finishes the operation on the UI screen, the mobile apparatus 102 requests the server apparatus 104 for the terminal command based on the inputted information for causing the terminal apparatus 101 to operate (S319).

When the terminal command request is outputted from the mobile apparatus 102, the server apparatus 104 generates, upon receipt of the terminal command request, the terminal command to cause the terminal apparatus 101 to operate, in accordance with the model number (type) of the terminal apparatus 101 and the setting made by the user at S318 (S320).

The terminal command thus generated is to be executed by the terminal apparatus 101. Examples of the terminal command include a command to start the rice cooking in the selected rice cooking mode, a command to set the reservation timer for rice cooking, a command to specify the operation of the terminal apparatus 101 so as to cause the terminal apparatus 101 to operate as specified.

Figure 4:
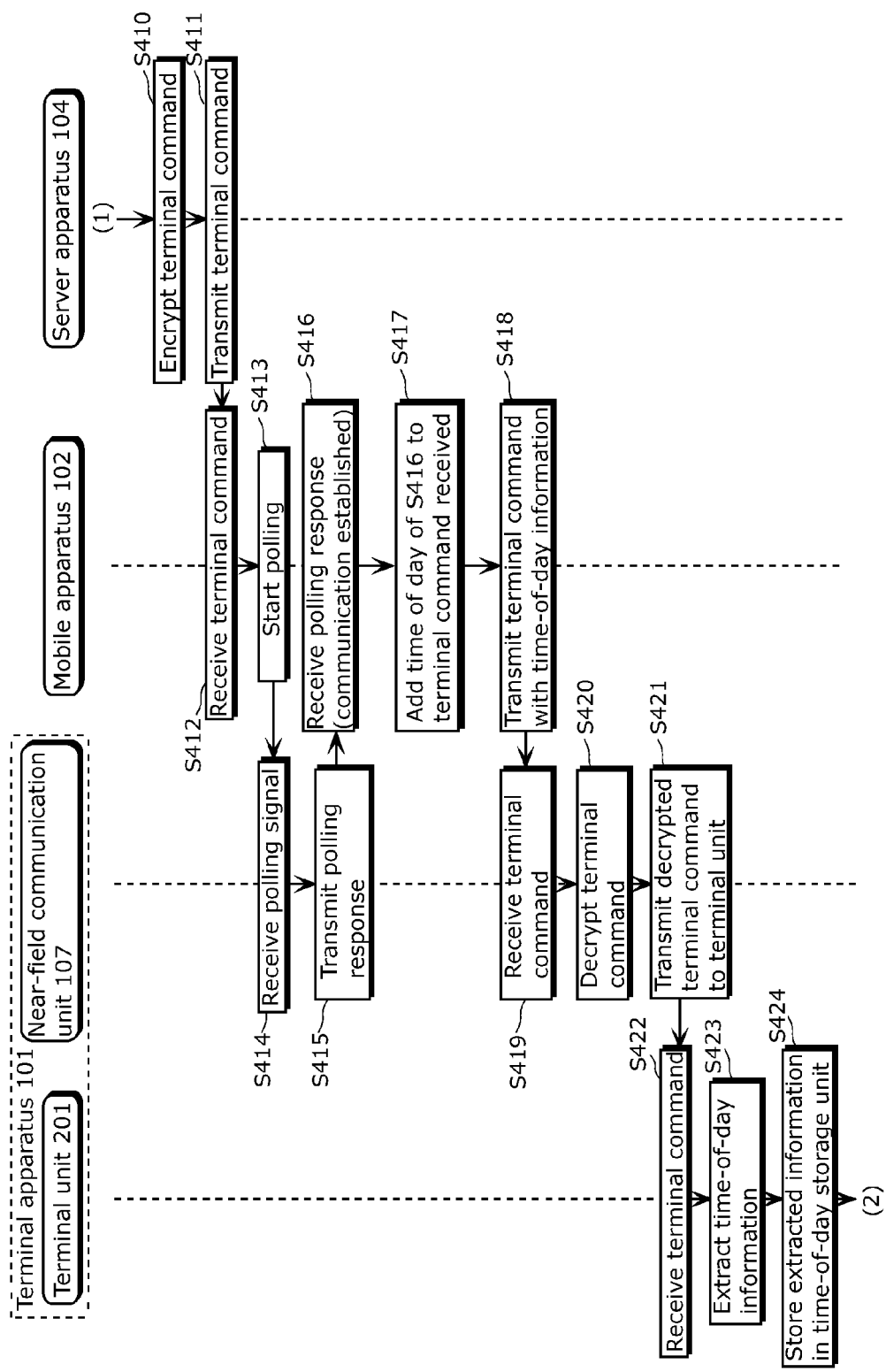
FIG. 4 is a sequence chart showing an operation that follows the operation shown in FIG. 3.

FIG. 4 is a sequence chart showing the operation of each apparatus, performed after the server apparatus 104 encrypts the terminal command until the terminal apparatus 101 receives the encrypted terminal command.

The server apparatus 104 encrypts the terminal command generated at S320 (S410). With the encryption, the terminal command specifying the operation of the terminal apparatus 101 can be prevented from being falsified or replaced by a third party on the communication path between the server apparatus 104 and the mobile apparatus 102. Accordingly, a malicious cheating such as causing the terminal apparatus 101 to act unexpectedly can be excluded, which allows the user to utilize the terminal apparatus 101 with confidence.

The server apparatus 104 transmits the terminal command encrypted at S410 to the mobile apparatus 102 (S411).

Upon receipt of the terminal command (S412), the mobile apparatus 102 causes the near-field module (near-field communication module) to start the polling (S413).

The near-field communication unit 107 of the terminal apparatus 101 receives the polling signal transmitted from the mobile apparatus 102 at S413 (S414).

Upon receipt of the polling signal at S414, the near-field communication unit 107 generates a polling response signal including the inherent ID of the near-field communication unit 107, and transmits the generated polling response signal to the mobile apparatus 102 (S415).

When the mobile apparatus 102 receives the polling response signal transmitted from the near-field communication unit 107, the near-field communication between the terminal apparatus 101 and the mobile apparatus 102 is established (S416).

The mobile apparatus 102 acquires, once the near-field communication between the terminal apparatus 101 and the mobile apparatus 102 is established, the time-of-day information indicating the time of day at which the near-field communication was established, from the clock 112 in the mobile apparatus 102. Then the mobile apparatus 102 adds the acquired time-of-day information to the terminal command received from the server apparatus 104 at S412 (S417).

Although according to this embodiment the time-of-day information added at this stage corresponds to the time of day at which the near-field communication between the terminal apparatus 101 and the mobile apparatus 102 was established, a different arrangement may be made.

In other words, in the case where the time-of-day information corresponding to the time of day at which the timer 224 is to be activated can be presumed, it is preferable to adopt the presumed time-of-day information representing the time of day at which the timer 224 is to be activated.

This is because such an arrangement minimizes the deviation of the time of day generated by the time-of-day generation unit 225 from the actual time of day, to thereby bring the time-of-day information to be added to the use history information generated by the use history information generation unit 226 closer to the actual time of day.

Therefore, the time-of-day information to be added may be generated at a desired time point in the period between the establishment of the near-field communication and the activation of the timer 224. In this case, the time-of-day information may be set in the time-of-day storage unit 223 through the near-field communication and, taking into account a delay time before the timer 224 is activated, the time-of-day information representing the time of day at which the timer 224 is to be activated with that delay may be generated.

After adding the time-of-day information to the terminal command at S417, the mobile apparatus 102 transmits the terminal command accompanied with the time-of-day information to the near-field communication unit 107 of the terminal apparatus 101 (S418).

The near-field communication unit 107 of the terminal apparatus 101 receives the terminal command transmitted from the mobile apparatus 102 at S418 (S419). Since the received terminal command is encrypted by the server apparatus 104, the near-field communication unit 107 decrypts the terminal command (S420).

The terminal command decrypted at S420 is transmitted to the terminal unit 201 through the serial interface 214 (S421).

The controller 105 of the terminal unit 201 receives the terminal command transmitted at S421 (S422).

The controller 105 extracts the time-of-day information representing the time of day at which the near-field communication was established, from the terminal command (S423).

The controller 105 stores the extracted time-of-day information in the time-of-day storage unit 223 of the main memory 106 (S424).

At the same time as storing the time-of-day information in the time-of-day storage unit 223 at S424, the controller 105 activates the timer 224. Once the timer 224 is activated, the timer 224 measures the time.

Figure 5:
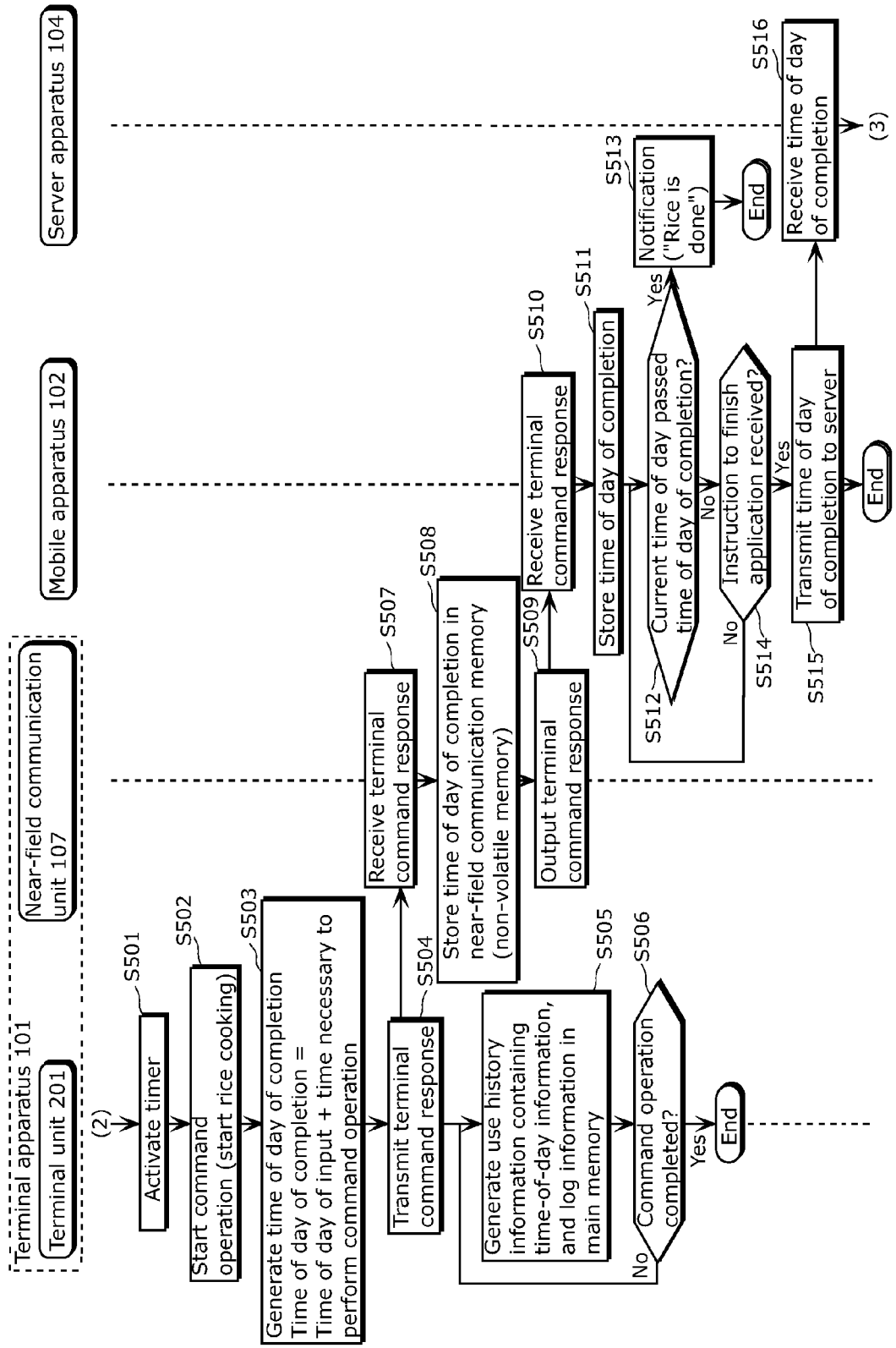
FIG. 5 is a sequence chart showing an operation that follows the operation shown in FIG. 4.

FIG. 5 is a sequence chart showing the operation of each apparatus, following S424 in FIG. 4 (after the terminal apparatus 101 stores the time-of-day information in the time-of-day storage unit 223).

After activating the timer 224, the terminal apparatus 101 starts the operation in accordance with the received terminal command. In the case where the terminal apparatus 101 is a rice cooker and, for example, the terminal command includes the instruction to start the rice cooking, the terminal apparatus 101 starts the rice cooking operation (S502).

After S502, the controller 105 generates the time of day to complete the rice cooking operation (information indicating that time of day) (S503).

The time of day to complete the terminal command (operation designated by the terminal command) can be calculated by adding the time it takes to complete the operation designated by the terminal command to the time of day stored in the time-of-day storage unit 223. The time it takes to complete the terminal command (operation designated by the terminal command) is stored in advance in the main memory 106, with respect to each terminal command.

After generating the time of day to complete the terminal command at S503, the terminal unit 201 outputs the terminal command response to the mobile apparatus 102, in response to the terminal command received at S422 (S504). To the terminal command response, the time of day to complete the terminal command, generated at S503, is added.

Now, while the terminal apparatus 101 is performing the operation in accordance with the terminal command, the terminal unit 201 sequentially generates the use history information of the terminal apparatus 101. More specifically, the terminal unit 201 generates the time-of-day information on the basis of the time-of-day information stored in the time-of-day storage unit 223 and the elapsed-time information provided by the timer 224. Then the use history information generation unit 226 generates the use history information containing the time-of-day information corresponding to each of the operations, triggered by the state transition of the terminal apparatus 101 or occurrence of an error. The use history information generation unit 226 then stores the generated use history information in the RAM (history region) 221 (S505). The process of S505 is repeatedly performed (see No at S506).

Here, in order to efficiently utilize the capacity of the RAM (history region) 221, the generation of the current time-of-day information from the time-of-day information stored in the time-of-day storage unit 223 and the timer information corresponding to each operation is performed by the time-of-day generation unit 225, when an error occurs, when the internal state transits, or when the user makes an input. The use history information generation unit 226 generates information that includes the generated time-of-day information at least as a part thereof, as the use history information.

Then the controller 105 of the terminal unit 201 decides whether the operation designated by the terminal command has been completed (S506), and in the case where the operation has been completed the controller 105 finishes the system operation of the terminal unit 201. In the case where the operation has not been completed, the logging of the use history information as S505 is continued.

When the terminal unit 201 transmits the terminal command response at S504, the near-field communication unit 107 receives the terminal command response through the serial interface 214 (S507).

The near-field communication unit 107 stores the time of day to complete the operation designated by the terminal command, included in the received terminal command response, in the non-volatile memory of the near-field communication memory 207 (S508).

After storing the time of day to complete the operation designated by the terminal command in the near-field communication memory 207, the near-field communication unit 107 transmits the terminal command response received from the terminal unit 201 to the mobile apparatus 102 through the near-field communication (S509).

Upon receipt of the terminal command response transmitted at S509 (S510), the mobile apparatus 102 extracts the time of day to complete the operation designated by the terminal command, out of the received terminal command response. The mobile apparatus 102 then stores the extracted time of day to complete the operation in the storage unit (not shown) of the mobile apparatus 102 (S511).

Then the mobile apparatus 102 compares the time of day to complete the operation stored at S511 with the current time of day indicated by the clock 112 (see FIG. 1) of the mobile apparatus 102 (S512), and notifies the user, in the case where the current time of day has passed the time of day to complete the operation, to the effect that the operation designated by the command has been completed, by a display on the display unit 110, a sound, or vibration (S513). In the case where the terminal command is the rice cooking command, the mobile apparatus 102 notifies the user that the rice cooker has completed the rice cooking operation.

On the contrary, in the case where it is decided at S512 that the current time of day has not yet reached the time of day to complete the operation, the mobile apparatus 102 decides whether the currently running application is set to be finished (S514). In the case where the operation to finish the application has not been performed, the mobile apparatus 102 again compares the current time of day with the time of day to complete the operation (S514 to S512). Upon detecting the instruction to finish the application, the mobile apparatus 102 transmits the time of day to complete the operation of the terminal command to the server apparatus 104 (S515), and finishes the application.

After S515, the server apparatus 104 receives the time of day to complete the operation (S516).

Figure 6:
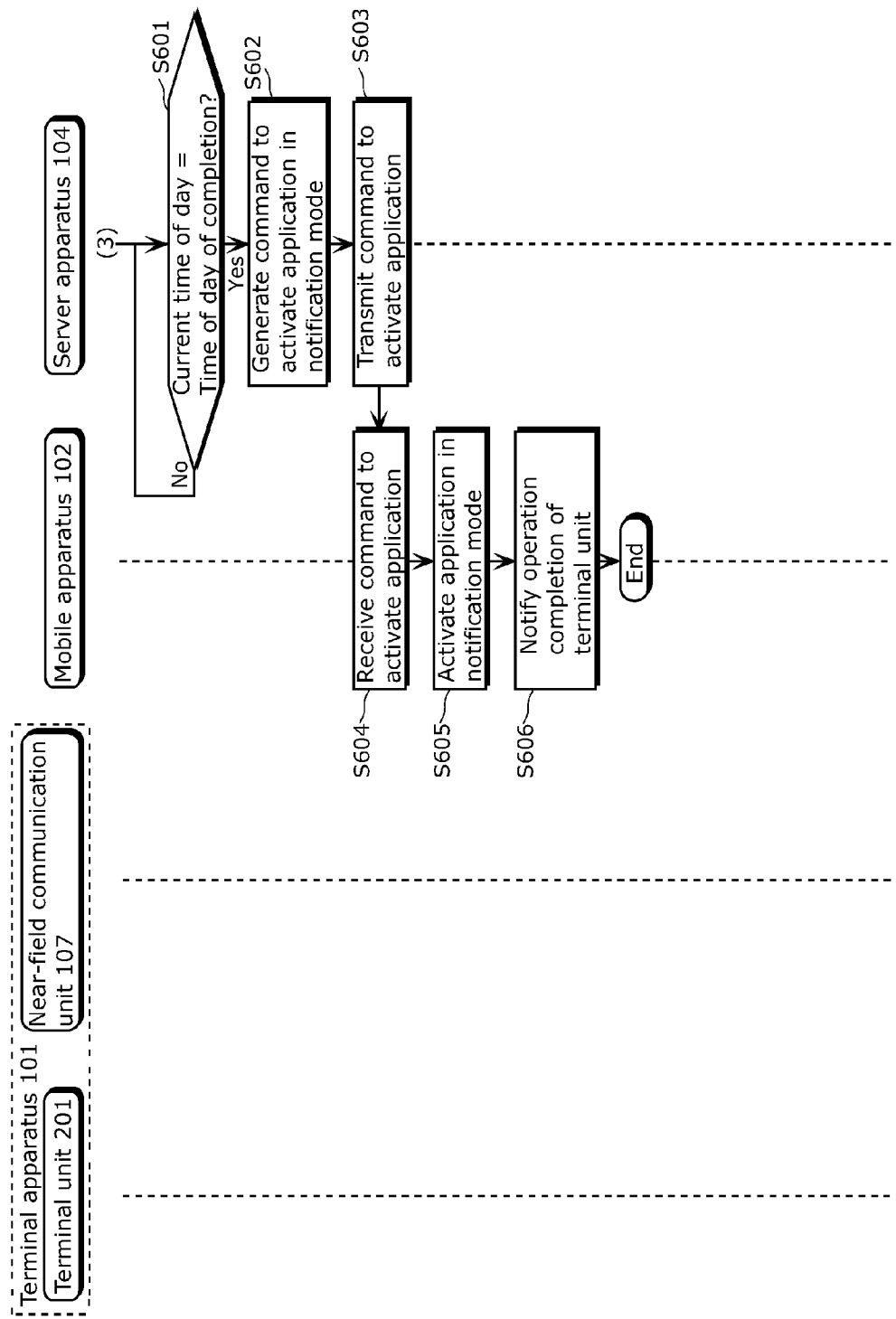
FIG. 6 is a sequence chart showing an operation that follows the operation shown in FIG. 5.

FIG. 6 is a sequence chart showing the operation of each apparatus, following S516 in FIG. 5 (after the server apparatus 104 receives the time of day to complete the operation).

Upon receipt of the time of day to complete the operation, the server apparatus 104 acquires the current time of day from a clock provided in the server apparatus 104, and compares the acquired current time of day with the time of day to complete the operation stored in the server apparatus 104 (S601).

In the case where the current time of day has not yet reached the time of day to complete the operation, the operation of S601 is continued. On the contrary, in the case where it is decided that the current time of day has passed the time of day to complete the operation, the server apparatus 104 generates an activation command of an application for notifying the mobile apparatus 102 (notification mode) that the time of day to complete the operation is past (S602).

Upon generating the activation command at S602, the server apparatus 104 transmits the generated activation command to the mobile apparatus 102 (S603).

Upon receipt of the activation command transmitted at S603 (S604), the mobile apparatus 102 activates the designated application in accordance with the received activation command (S605).

Then upon activating the application, the mobile apparatus 102 outputs a notification to the effect that the operation designated by the terminal command has been completed. In the case where the terminal command is a rice cooking command, a notification to the effect that the rice cooking has been completed is outputted (S606).

As described above, the system according to this embodiment includes the terminal apparatus 101 composed of the terminal unit 201 and the near-field communication unit 107, the mobile apparatus 102, and the server apparatus 104.

According to this embodiment, the current time-of-day information is generated on the basis of the timer 224 of the terminal apparatus 101 and the time-of-day information provided by the mobile apparatus 102. Then the use history information containing the time-of-day information thus generated is made up with respect to each operation status of the terminal apparatus 101.

Such a configuration enables the use history information containing the time-of-day information to be generated without the need to install a clock device in the terminal apparatus 101, thus allowing the use history information containing the time-of-day information to be generated with a simplified configuration compared with the case of employing a clock device. In addition, since the time of day can be calculated only with the timer without employing a clock device, the use history information containing the time-of-day information can be generated without incurring an increase in manufacturing cost of the terminal apparatus 101.

According to this embodiment, further, collecting the use history information containing the time-of-day information in the server apparatus 104 enables the user's life pattern and the time zone of use to be extracted, thereby allowing provision of a service that closely fits the user's life pattern.

For example, some power companies offer a time zone charge plan designed for all-electric homes. According to this plan, the electricity charge is significantly reduced for midnight use (between 23:00 and 7:00). Therefore, for example if it is revealed from the use history information containing the time-of-day information that the user cooks rice, or uses other home electric appliances around 22:30, advisory information to the effect that using those home electric appliances after 23:00 leads to saving of the electricity charge can be provided to the user as an additional service.

Further, the terminal command is designated to the terminal apparatus 101 from the mobile apparatus 102, and the time of day at which the operation designated by the terminal command is outputted from the terminal apparatus 101 and set in the mobile apparatus 102. Such an arrangement enables the mobile apparatus 102 to output, when the operation of the terminal apparatus 101 designated by the terminal command is completed, the notification to that effect.

In the existing systems in general, the terminal apparatus 101 itself is designed to output the notification of completion. For example, rice cookers and washing machines notifies the completion of the operation to the user by audible announcement or the like.

However, although the terminal apparatus 101 outputs the audible announcement, if the user is not located in the vicinity of the terminal apparatus 101 the announcement does not reach the user, thus resulting in vain. In addition, the audible announcement does not work with persons having difficulty in hearing.

According to the present invention, accordingly, the time of day to complete the operation designated by the terminal command is set in the mobile apparatus 102, and the mobile apparatus 102 outputs the notification of completion of the operation designated by the terminal command. Since the mobile apparatus 102 is usually carried by the user with him/her, the completion of the operation designated by the terminal command can be notified to the user regardless of whether the user is located in the vicinity of the terminal apparatus 101.

In addition, a popular mobile phone exemplifying the mobile apparatus 102 has notification functions that depend on tactile and visual sensations (vibration and display screen), which allows the notification to be outputted in a form that fits the condition of the user, without limitation to the audible announcement, thereby improving the user-friendliness of the system.

In the case of outputting the notification from the mobile apparatus 102, the application for outputting the notification has to be continuously activated, which leads to faster consumption of the battery power, and may even lead to failure to activate other applications.

In the system according to this embodiment, therefore, the mobile apparatus 102 transmits the time of day to complete the operation to the server apparatus 104, in the case where the application for notification has to be suspended while outputting the notification to the user or performing another operation. In general, server apparatuses are under real-time control for 24 hours, and in case that the system should break down a recovery system is activated, so as to secure the robustness of the system.

Accordingly, the server apparatus 104 may be set to monitor the time of day to complete the operation designated by the terminal command, so as to activate the application for notification in the mobile apparatus when the time of day to complete the operation is reached. However, causing the server apparatus 104 to constantly monitor the time of day leads to an increase in load of the server, and therefore it is preferable that the mobile apparatus 102 monitor the time of day until the application is finished, and that when the application is finished the monitoring job be seamlessly transferred to the server, so that the load can be properly distributed.

The method of notification is not limited to activating the application for notification. For example, transmitting an e-mail to the mobile apparatus 102 provides the same effect.

Figure 7:
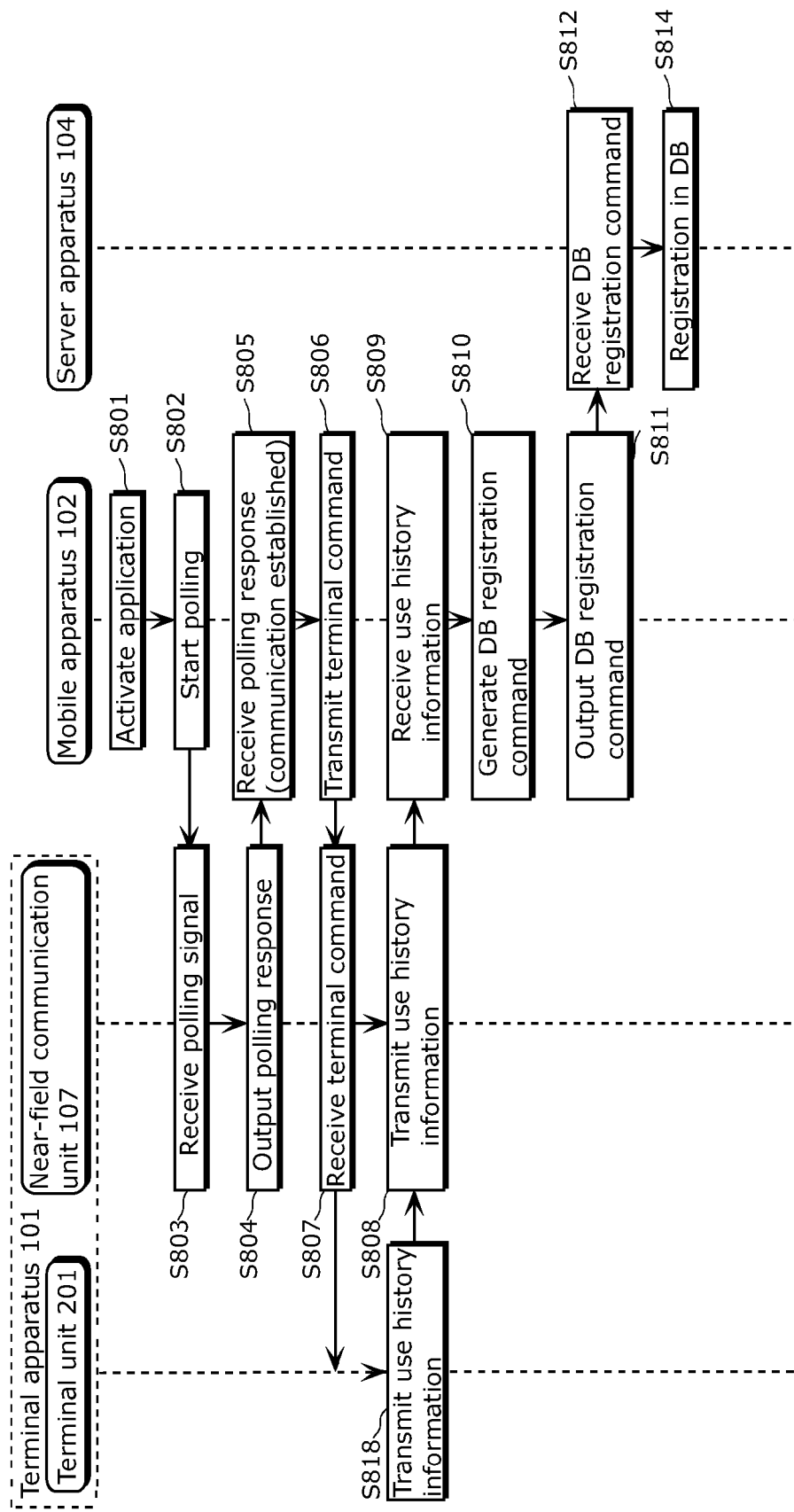
FIG. 7 is a sequence chart showing an operation of apparatuses according to a variation of the embodiment 1.

FIG. 7 is a sequence chart showing the operation of each apparatus according to a variation of the embodiment 1.

The terminal apparatus 101 transmits the use history information stored therein to the mobile apparatus 102, upon receipt of a command from the terminal apparatus 101.

In FIG. 7, the operations from S801 to S805, i.e., after the mobile apparatus 102 activates the application until the near-field communication is established, are the same as those according to S301 to S305 in FIG. 3, and hence the description will not be repeated.

Upon establishing the near-field communication with the terminal apparatus 101, the mobile apparatus 102 transmits the terminal command to the terminal apparatus 101 requesting for the use history information (S806).

After the near-field communication unit 107 of the terminal apparatus 101 receives the terminal command from the mobile apparatus 102 (S807), the terminal unit 201 reads out the use history information stored, for example, in the main memory 106, more specifically the RAM (history region) 221 (S818). Then the mobile apparatus 102 transmits the use history information read out through the near-field communication unit 107, to the mobile apparatus 102 (S808).

The use history information transmitted at S808 may be, for example, the use history information generated at S505 in FIG. 5 and stored in the main memory 106, i.e., the use history information containing the time-of-day information with respect to each operation status. Here, the generated use history information may be stored in the near-field communication memory 207 (see FIG. 2) of the near-field communication unit 107, instead of the main memory 106 (RAM (history region) 221) of the terminal unit 201. In this case, the near-field communication unit 107 transmits the use history information stored in the near-field communication memory 207, upon receipt of the terminal command (S807 to S808).

After the mobile apparatus 102 receives the use history information transmitted from the near-field communication unit 107 of the terminal apparatus 101 (S809), the mobile apparatus 102 generates the command to register the received use history information in the server apparatus 104 (DB registration command) (S810).

This command includes, for example, the received use history information, and is intended to identify the use history information in the server apparatus 104.

Then the mobile apparatus 102 transmits the generated DB registration command to the server apparatus 104 (S811).

Upon receipt of the DB registration command transmitted at S811, the server apparatus 104 registers the use history information identified on the basis of the command in the database of the server apparatus 104 (S814).

For transmission of the DB registration command from the mobile apparatus 102 to the server apparatus 104 at S811, a network such as Internet, the mobile phone network, or wireless fidelity (WiFi), or a combination thereof may be employed.

The management entity of the server apparatus 104 may be, for example, the manufacturer of the terminal apparatus 101, a distributor of the terminal apparatus 101, or a maintenance company of the terminal apparatus 101.

At S808, the terminal apparatus 101 may encrypt the use history information before transmitting it to the mobile apparatus 102. In this case, the server apparatus 104 decrypts the use history information upon receipt thereof at S812 and before registration of the same in the database (S814).

In the process shown in FIG. 7, when the terminal apparatus 101 transmits the use history information to the mobile apparatus 102 through the near-field communication, the mobile apparatus 102 may set the time-of-day information in the terminal apparatus 101 at the same time. More specifically, when the terminal apparatus 101 transmits the use history information to the mobile apparatus 102 through the near-field communication in FIG. 7, the mobile apparatus 102 may transmit the terminal command including the time-of-day information to the terminal apparatus 101 through the near-field communication.

In this process, further, the terminal apparatus 101 may perform the operation designated by the received terminal command as in S501 to S506 in FIG. 5. The operation designated by the terminal command includes, for example starting the rice cooking, reserving the rice cooking and so forth, in the case where the terminal apparatus 101 is a rice cooker. In the case where the terminal apparatus 101 is a washing machine instead, the operation to be performed may be starting to wash, reserving the washing, and so forth.

Here, the mobile apparatus 102 may set the time-of-day information in the terminal apparatus 101 at the same time as when the aforementioned operation (start of the rice cooking, etc.) is performed, or alternatively the mobile apparatus 102 may set the time-of-day information in the terminal apparatus 101 before the aforementioned operation (start of the rice cooking, etc.) is performed. In other words, it suffices that the time point at which the time-of-day information is set corresponds to the time point at which the above operation (start of the rice cooking, etc.) is performed. Further, the transmission of the use history information from the terminal apparatus 101 to the mobile apparatus 102 may be performed at S308 and S309 in FIG. 3. In this case, the terminal information transmitted at S308 and S309 includes the use history information. Then at S311 the mobile apparatus 102 transmits the use history information to the server apparatus 104, and at S314 the server apparatus 104 registers the use history information.

Figure 8:
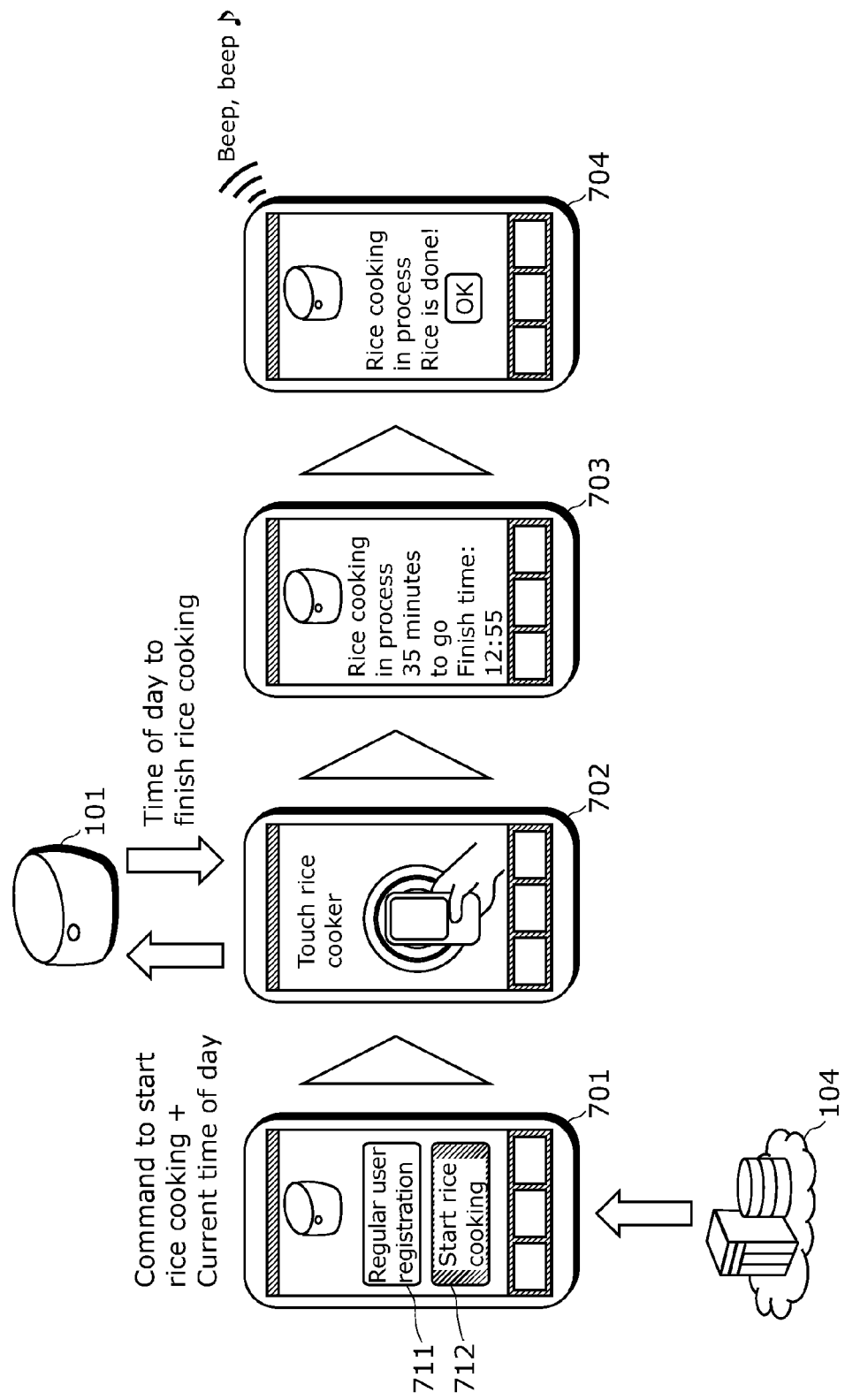
FIG. 8 is a schematic drawing showing screen transitions realized in the case where a terminal apparatus is a rice cooker, in the system according to the embodiment 1.

FIG. 8 is a schematic drawing showing screen transitions realized in the case where the terminal apparatus 101 is a rice cooker, in the system according to this embodiment.

At S315 in FIG. 3, the server apparatus 104 generates the UI information and transmits the generated UI information to the mobile apparatus 102. Upon receipt of the UI information, the mobile apparatus 102 displays the UI information on the display unit 110.

Here, an operation of the server apparatus 104 for generating the UI information will be described. In advance thereto, the mobile apparatus 102 receives the information of the model number or serial number of the terminal apparatus 101 from the near-field communication memory 207 of the terminal apparatus 101, through the near-field communication. The server apparatus 104 acquires the model number or serial number of the terminal apparatus 101 through the mobile apparatus 102. The server apparatus 104 then generates the UI information in accordance with the received information of the model number or serial number.

In the case where the terminal apparatus 101 is a rice cooker as shown in the screen 701 in FIG. 8, the server apparatus 104 generates the UI information in accordance with the received information of the model number or serial number. Thus, because of the generation of the UI information, a regular user registration button 711 and a rice cooking start button 712 are displayed on the display unit 110 of the mobile apparatus 102.

Upon receipt of the UI information from the server apparatus 104 and displaying the UI screen representing the UI information, the mobile apparatus 102 accepts an inputting operation performed on the UI screen (UI operation) (S318). In the example described below, it will be assumed that the user has pressed the rice cooking start button 712.

Once the rice cooking start button 712 is pressed, the mobile apparatus 102 requests the server apparatus 104 to transmit the terminal command to cause the terminal apparatus 101 to start the rice cooking (S319). The server apparatus 104 then generates the terminal command (S320), and the mobile apparatus 102 receives the terminal command generated by the server apparatus 104 (S412).

Upon receipt of the terminal command from the server apparatus 104, the mobile apparatus 102 displays an announcement for transmitting the received terminal command, on the display unit 110 (screen 702 in FIG. 8). An example of the announcement is shown in the screen 702 in FIG. 8. As shown therein, the user makes the mobile apparatus 102 touch the terminal apparatus 101, in view of the displayed announcement.

At the same time as displaying the announcement on the display unit 110, the mobile apparatus 102 also starts the polling from the near-field communication unit (S413).

After S413, when the user makes the mobile apparatus 102 touch the terminal apparatus 101 which is the rice cooker, the near-field communication unit 107 of the terminal apparatus 101 receives the polling signal outputted from the mobile apparatus 102. The terminal apparatus 101 (near-field communication unit 107) then transmits the polling response to the mobile apparatus 102 as a response to the received polling signal, and once the mobile apparatus 102 receives the polling response the near-field communication is established between the mobile apparatus 102 and the terminal apparatus 101.

When the near-field communication is established between the mobile apparatus 102 and the terminal apparatus 101, the mobile apparatus 102 acquires the time-of-day information indicating the time at which the communication was established, from the clock 112 of the mobile apparatus 102. Then the mobile apparatus 102 adds the acquired time-of-day information to the terminal command received from the server apparatus 104, and transmits the terminal command accompanied with the time-of-day information to the terminal apparatus 101, through the near-field communication (S418).

When the rice cooker exemplifying the terminal apparatus 101 receives the command to start the rice cooking as the terminal command, the encryption/decryption unit 230 in the near-field communication unit 107 decrypts the command to start the rice cooking thus far encrypted, and actually starts the rice cooking operation in accordance with the received command to start the rice cooking.

In addition, the controller 105 in the terminal unit 201 stores the time-of-day information added to the received terminal command in the time-of-day storage unit 223 of the main memory 106, and activates the timer 224 thus to start to measure the elapsed time.

Further, once the command to start the rice cooking is set in the terminal apparatus 101, the controller 105 determines the time of day at which the operation being performed in accordance with the received command to start the rice cooking is to be completed.

In this process, the time of day at which the terminal command is to be completed is estimated by adding the time it takes to complete the terminal command to the received time-of-day information. The terminal apparatus 101 transmits the estimated time of day at which the terminal command is to be completed to the mobile apparatus 102, as the time of day to complete the rice cooking operation.

When the mobile apparatus 102 receives the time of day to complete the rice cooking operation, the timer information indicating the length of time before the terminal command is completed, as well as the time-of-day information indicating the time of day at which the terminal command is completed are displayed on the display unit 110, and such information is stored in the storage unit of the mobile apparatus 102.

The mobile apparatus 102 starts to compare the stored time of day to complete the terminal command with the current time of day acquired from the clock 112, and once the current time of day acquired from the clock 112 reaches the time of day to complete the operation the mobile apparatus 102 outputs the notification by audible announcement, visual display, or vibration.

According to this embodiment, as described thus far, the terminal apparatus 101 can be operated by using the mobile apparatus 102.

Normally, many of the home electric appliances are unable to be incorporated with a rich user interface, because of some reasons including restriction in the aspect of cost. Accordingly, in order to realize a complicated operation, for example a small number of switches have to be toggled many times, which forces the user to perform troublesome operations.

For example, reservation for rice cooking or a custom setting of a washing machine requires at least between ten and twenty times, and sometimes even tens of times of button operation.

However, some of the mobile apparatuses, typically exemplified by a smartphone, carry a rich and user-friendly user interface such as a large screen, a touch panel, and so forth.

In the system according to this embodiment, therefore, the rich user interface offered by the mobile apparatus 102 can be utilized to operate the home electric appliances.

In addition, normally the terminal apparatus in the system according to this embodiment is not provided with a clock device. Accordingly, in the case of collecting the use history information of the terminal apparatus 101, it is possible to collect only the use history information not accompanied with the time-of-day information indicating the time of day at which the operation was performed.

However, according to this embodiment the time-of-day information can be set in the terminal apparatus 101 through the near-field communication from the mobile apparatus 102, which normally has a clock device (clock 112), and therefore the use history information containing the time-of-day information can be generated in the terminal apparatus 101.

According to this embodiment, further, when the mobile apparatus 102 sets the terminal command received from the server apparatus 104 in the terminal apparatus 101 through the near-field communication, the terminal apparatus 101 transmits the time of day to complete the operation designated by the terminal command and the length of time before the completion to the mobile apparatus 102. Such an arrangement achieves synchronization between the operation of the terminal apparatus 101 designated by the terminal command and the operation status of the terminal apparatus displayed on the mobile apparatus 102, despite the terminal apparatus 101 and the mobile apparatus 102 not constantly communicating with each other.

In the case of the near-field communication, generally, the communication can only be made only when the terminal apparatus 101 and the mobile apparatus 102 are sufficiently close to each other. Accordingly, upon locating the mobile apparatus 102 away from the terminal apparatus 101 after the terminal command is set in the terminal apparatus 101, the near-field communication between the terminal apparatus 101 and the mobile apparatus 102 is disconnected.

The aforementioned condition makes it difficult to synchronize the operation status of the terminal apparatus 101 with the mobile apparatus 102 or the server apparatus 104, by maintaining the connection for communication between the mobile apparatus 102 and the terminal apparatus 101. Naturally, it is also difficult for the mobile apparatus 102 to output the notification to the user when the operation designated by the terminal command is completed.

However, in the system according to this embodiment, the terminal apparatus 101 transmits the time necessary for performing the operation designated by the terminal command, as well as time of day to complete the operation, to the mobile apparatus 102 once the terminal command is set in the terminal apparatus 101. Such an arrangement allows the mobile apparatus 102 to output the notification of the completion of the terminal command to the user, despite the terminal apparatus 101 and the mobile apparatus 102 not constantly communicating with each other.

FIG. 9 is a schematic drawing showing the use history information to be collected (left column) and the use history information made up on the basis of the time-of-day information (right column).

As shown in the use history information 801 (history information with the elapsed-time information) in FIG. 9, the format of conventional history information (use history information) is as follows.

The format only includes the use history information detected by the use history detection unit 216 accompanied with the elapsed-time information provided by the timer 224.

When the history information is made up in this format, the timer 224 is activated when the near-field communication is established between the terminal apparatus 101 and the mobile apparatus 102, and such history information as "00:00:00 near-field communication established" is made up as the initial history information.

In this example, the rice cooking operation is immediately started following the activation of the timer 224, and hence such history information as "00:00:01 rice cooking started" is made up.

Thereafter, each time the internal status of the terminal apparatus 101 changes the elapsed-time information is read out from the timer 224 and the operation status information (history information) is generated, up to the history information of "00:35:00 rice cooking completed".

Then the generated operation status information is stored in the RAM (history region) 221.

On the other hand, the history information generated by the use history information generation unit 226 of the terminal apparatus 101 according to this embodiment is expressed as shown in the use history information 802 (history information generated on the basis of the time-of-day information) in FIG. 9.

The history information 802 is accompanied with the time-of-day information inputted through near-field communication and the time-of-day information generated by adding the elapsed-time information from the timer 224, which are associated with each transition in the history. Further, in the case where date information and owner information of the mobile apparatus are inputted from the mobile apparatus 102 through the near-field communication, in addition to the time-of-day information, the date information and the owner information thus inputted can be added to the history information.

Thus, while only the elapsed-time information is included in the conventional history information, the history information containing the time-of-day information can be generated with the technique according to this embodiment.

Further, the history information thus generated is transmitted to the mobile apparatus 102 through the near-field communication, and upon receipt of the transmitted history information the mobile apparatus 102 transmits the received history information to the server apparatus 104. Such an arrangement allows the server apparatus 104 to analyze the history information.

Therefore, the server apparatus 104 can analyze the user's life pattern, such as when and in which mode the user operated the terminal apparatus 101. Consequently, efficient service that closely fits the analyzed life pattern can be provided to the user.

Figure 10:
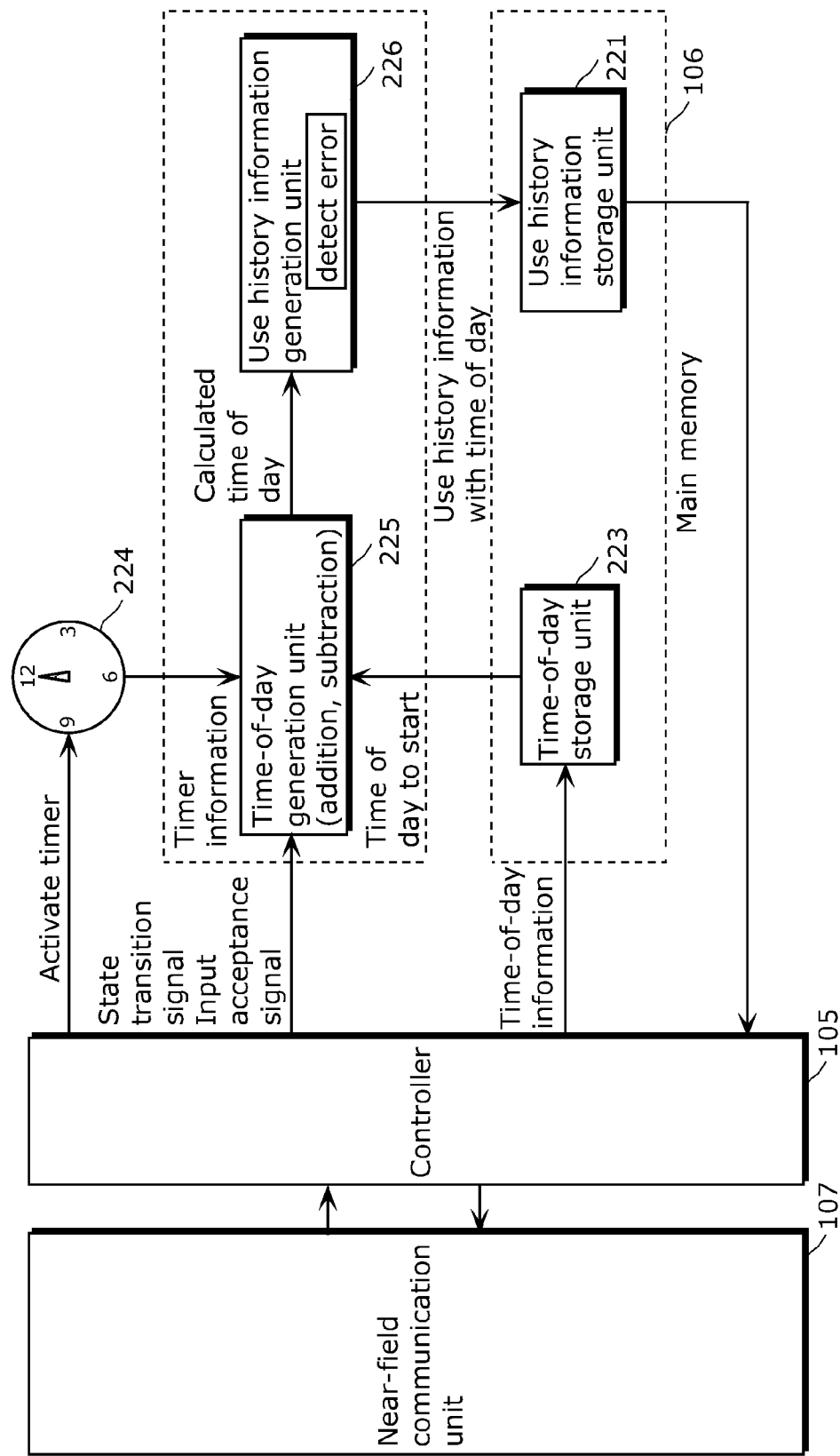
FIG. 10 is a block diagram showing a connection arrangement among a near-field communication unit, a controller, a main memory, a timer, a time-of-day generation unit, and a use history information generation unit according to the embodiment 1.

FIG. 10 is a block diagram showing a connection arrangement among the near-field communication unit 107, the controller 105, the main memory 106, the timer 224, the time-of-day generation unit 225, and the use history information generation unit 226 shown in FIG. 2.

First, upon receipt of the polling signal from the reader-writer of the mobile apparatus 102, the near-field communication unit 107 outputs the polling response to the mobile apparatus 102 that has outputted the polling signal, and the mobile apparatus 102 receives the polling response. At this stage, the near-field communication is established between the terminal apparatus 101 and the mobile apparatus 102.

The mobile apparatus 102 acquires the time-of-day information indicating the time of day at which the near-field communication was established from the clock device (clock 112 in FIG. 1), and transmits the acquired time-of-day information to the terminal apparatus 101 through the near-field communication now established. The time-of-day information is received by the near-field communication unit 107, and outputted to the controller 105.

Upon receipt of the time-of-day information, the controller 105 stores the received time-of-day information in the time-of-day storage unit 223 of the main memory 106, and outputs an activation instruction to the timer 224.

Upon receipt of the activation instruction from the controller 105, the timer 224 starts to count the elapsed time.

The controller 105 outputs a state transition signal or an input acceptance signal to the time-of-day generation unit 225, when the user inputs an instruction by operating the keypad 215, when the operation status of the controller changes, when an error is detected, and so forth.

Upon receipt of the state transition signal or the input acceptance signal from the controller 105, the time-of-day generation unit 225 receives the information of elapsed time being counted (timer information) from the timer 224, and also receives from the time-of-day storage unit 223 the time-of-day information stored therein, to thereby calculate the current time-of-day information by adding the elapsed-time information to the time-of-day information.

The time-of-day information thus calculated is outputted to the use history information generation unit 226, which generates the history information on the basis of the operation status of the controller 105, the input of instruction detected, the error information, and so forth, and stores the history information in the use history information storage unit 221 (RAM (history region)).

As described above, although the terminal apparatus 101 according to this embodiment is not provided with a clock device, the history information containing the time-of-day information can be generated as the information 802 shown in FIG. 9.

The use history information generation unit 226 may be a circuit that executes the information processing performed by the use history information generation unit 226. Alternatively, the function of the use history information generation unit 226 may be a functional block realized in the CPU 105 when the CPU 105 executes a program. However, FIG. 2 shows the configuration in which the use history information generation unit 226 is provided outside the CPU 105 for the sake of convenience for description, instead of the case where the use history information generation unit 226 is realized in the CPU 105.

The error detection unit 217, the use history detection unit 216, and the time-of-day generation unit 225 may also be each realized as a circuit or a functional block of the CPU 105, as the case of the use history information generation unit 226.

Embodiment 2

A system according to an embodiment 2 is configured similarly to the system according to the embodiment 1 (see FIGS. 1, 2).

Figure 11:
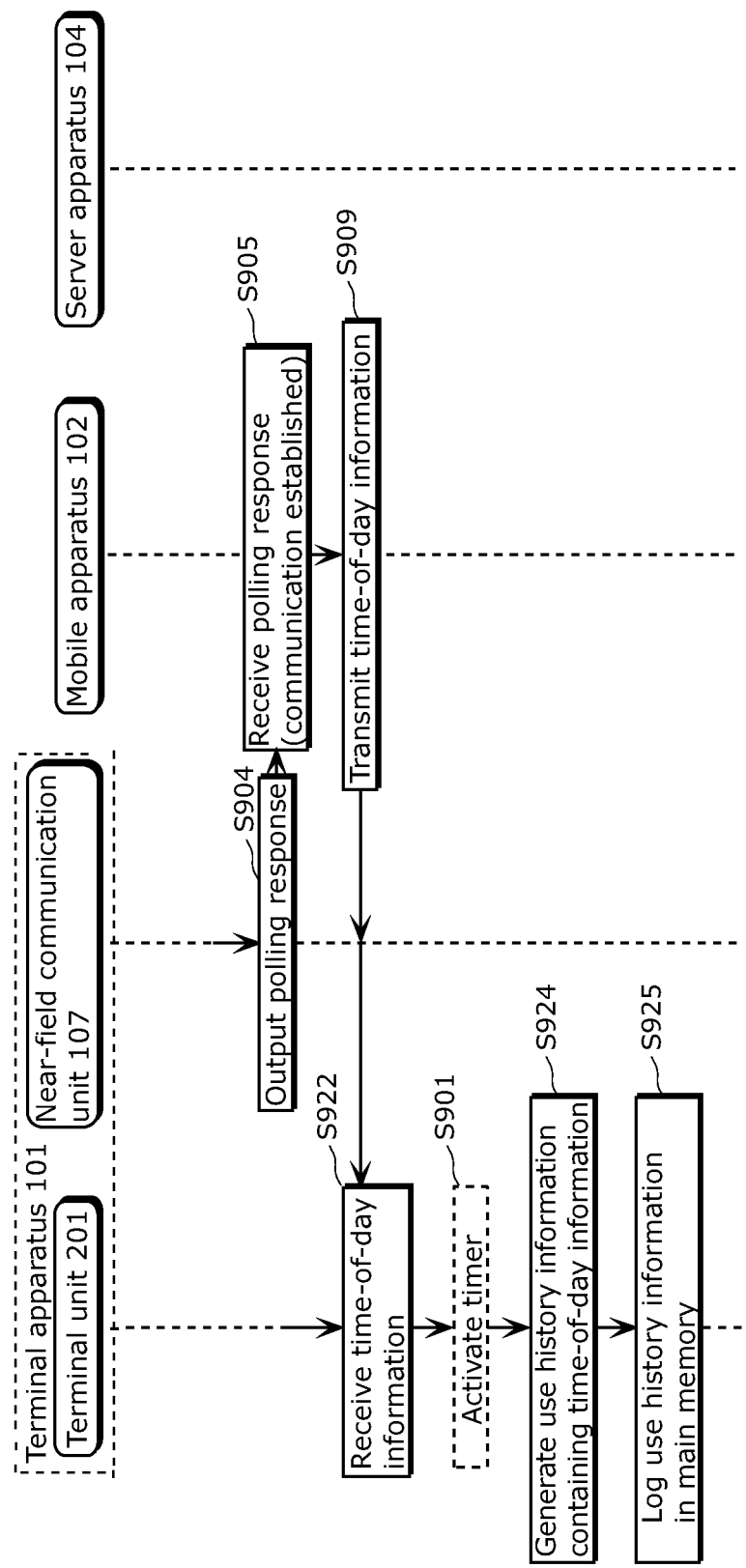
FIG. 11 is a sequence chart showing operations of apparatuses according to an embodiment 2 of the present invention.

FIG. 11 is a sequence chart showing an operation of the system according to the embodiment 2.

At S904 and S905, the terminal apparatus 101 and the mobile apparatus 102 establish the near-field communication therebetween (see S415, S416 in FIG. 4).

At S909, the mobile apparatus 102 transmits the time-of-day information to the terminal apparatus 101.

Regarding this transmission, the time-of-day information may be transmitted as a part of data (see terminal command in FIG. 3) when such data is transmitted.

At S922, the terminal unit 201 receives the transmitted time-of-day information.

Here, for example, the near-field communication unit 107 may receive the time-of-day information transmitted from the mobile apparatus 102, and transmit the received time-of-day information to the terminal unit 201, so that the terminal unit 201 receives the time-of-day information from the mobile apparatus 102. FIG. 11 schematically illustrates such a configuration.

At S924, the terminal unit 201 generates the use history information containing the time-of-day information corresponding to the time-of-day information received at S922.

The time-of-day information corresponding to the time-of-day information received at S922 is, for example, an identical copy of the received time-of-day information.

Alternatively, the time-of-day information corresponding to the time-of-day information received at S922 may be another time-of-day information from the foregoing identical time-of-day information.

Such another time-of-day information may be, for example, the time-of-day information indicating the time of day to be reached when the time according to the timer 224 passes after the time of day indicated by the time-of-day information received at S922.

The time-of-day information corresponding to the time-of-day information received at S922 may be, for example, the time-of-day information indicating the current time of day identified on the basis of the received time-of-day information.

For example, the operation of S901 in FIG. 11 may be performed at the time of day indicated by the time-of-day information (or sufficiently close thereto). In this operation, the elapsed time indicated by the timer 224 may be set as 0. Thus, the elapsed time indicated by the timer 224 may be the time elapsed after the time of day indicated by the received time-of-day information.

At S925, the generated use history information is stored in the RAM 221 of the main memory 106.

Such details of the embodiment 2 may be the same as those of the embodiment 1, or different therefrom.

Embodiment 3

According to the embodiment 1, the timer 224 is activated when the terminal apparatus 101 and the mobile apparatus 102 establish the near-field communication therebetween.

In this embodiment, the mobile apparatus 102 is brought close to the terminal apparatus 101 when the terminal apparatus 101 completes an operation (for example, when a rice cooker finishes the rice cooking operation), so as to collect the history information containing the time-of-day information.

Figure 12:
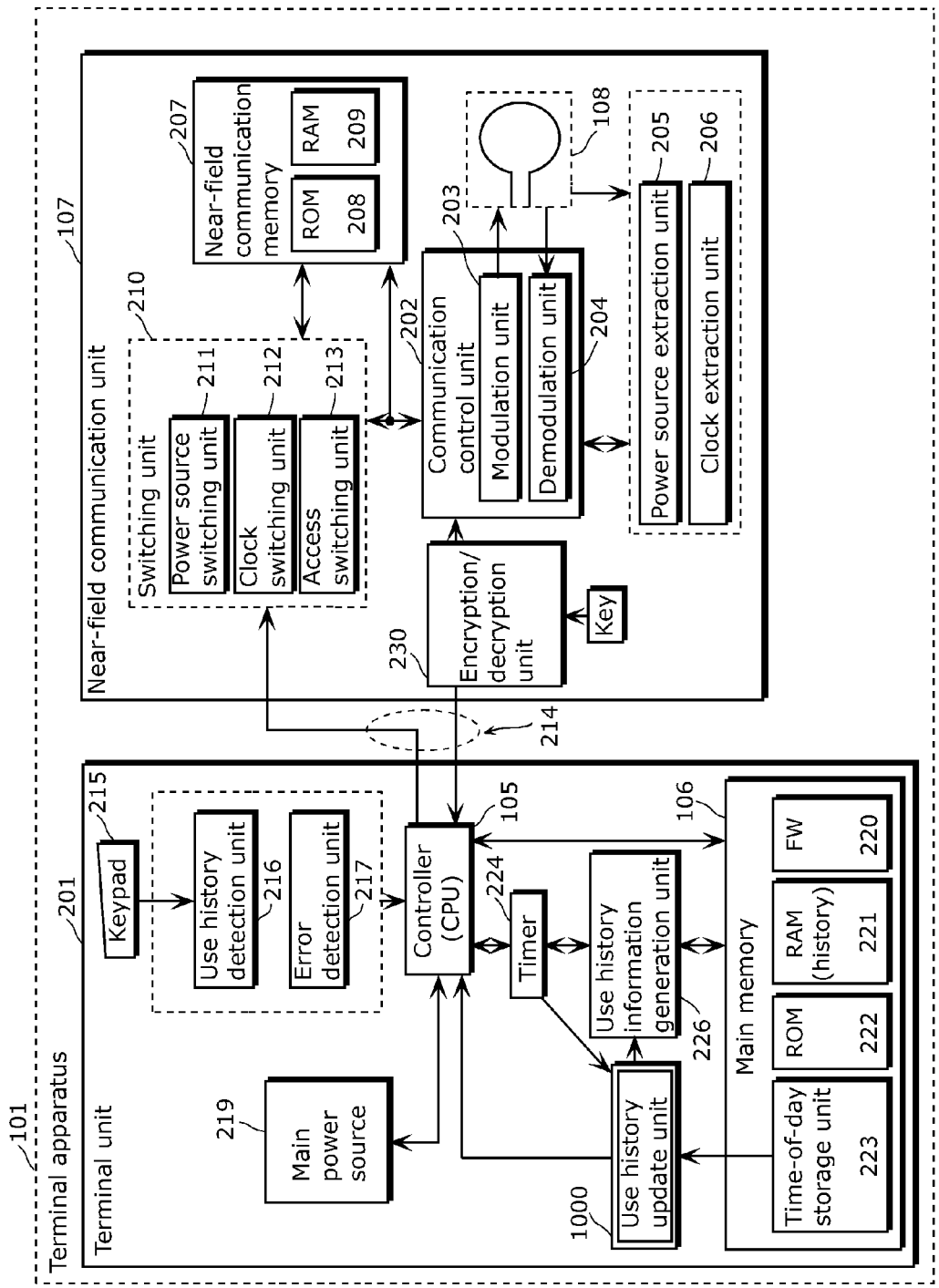
FIG. 12 is a block diagram showing a configuration of a terminal apparatus according to an embodiment 3 of the present invention.

FIG. 12 is a block diagram showing a configuration of the terminal apparatus 101 according to this embodiment.

The terminal apparatus 101 according to this embodiment is different from the terminal apparatus 101 according to the embodiment 1 (see FIG. 2) in the connection arrangement of the timer 224 and the use history information generation unit 226, and in that a use history information update unit 1000 is additionally provided.

The remaining functional blocks are configured in the same way as the corresponding ones of the terminal apparatus 101 according to the embodiment 1 (see FIG. 2). Such functional blocks are given the same numerals and detailed description thereof will not be repeated.

The timer 224 is activated when the user inputs an instruction to start an operation through the keypad 215 of the terminal apparatus 101, and starts to count the time from that point. In the case where the terminal apparatus 101 is a rice cooker, the timer 224 is activated when the rice cooking start button is pressed.

Here, the operation of the timer 224 includes a period in which the time is counted so that the elapsed time indicated by the timer 224 increases, and another period in which the time is not counted and hence the elapsed time remains unchanged. While the time is not counted before the timer 224 is activated, the timer 224 may enter the period of counting the time upon being activated. Likewise, both before and after the timer 224 is reset, the time may be counted. The elapsed time indicated at a start of a period after the resetting may be set as 0.

The use history information generation unit 226 generates the operation status information when the user operates the keypad 215, when the internal state of the controller 105 changes, when an error is detected by the error detection unit 217, and so forth. Then the use history information generation unit 226 adds the elapsed-time information from the timer 224 to the generated operation status information, to thereby generate the use history information that is the operation status information reflecting the addition of the elapsed time, and stores the generated use history information in the RAM (history region) 221 of the main memory 106.

Accordingly, the use history information stored in the RAM (history region) 221 at this point is only accompanied with the timer information, as the history information 801 shown in FIG. 9.

The time-of-day storage unit 223 of the main memory 106 receives, as the time-of-day storage unit 223 according to the embodiment 1, the time-of-day information indicating the time of day at which the near-field communication between the mobile apparatus 102 and the terminal apparatus 101 was established, from the mobile apparatus 102 through the near-field communication unit 107, and stores therein such time-of-day information.

In this embodiment, the time-of-day storage unit 223 stores the time-of-day information indicating the time of day corresponding to the completion of an operation of the terminal apparatus 101, unlike in the embodiment 1 in which the time-of-day information corresponding to the start of an operation of the terminal apparatus 101 is stored.

More specifically, according to the embodiment 1 the time-of-day information is set in the terminal apparatus 101 when a command to start an operation is set in the terminal apparatus 101 through the near-field communication. In this embodiment, in contrast, when the user brings the mobile apparatus 102 close to the terminal apparatus 101 at the completion of the operation of the terminal apparatus 101, the time-of-day information indicating the time of day of that point is stored in the time-of-day storage unit 223.

Once the mobile apparatus 102 is brought close to the terminal apparatus 101 so as to establish the near-field communication and then the time-of-day information is set in the time-of-day storage unit 223, the history information stored in the RAM (history region) 221 is transmitted to the mobile apparatus 102 through the near-field communication unit 107, through the near-field communication now established.

The history information transmitted at this point may be described as follows. Before such transmission, the RAM (history region) 221 stores history information accompanied with the timer information. Then the timer information accompanying the history information is converted into time-of-day information on the basis of the time-of-day information stored in the time-of-day storage unit 223 and the timer information from the timer 224 indicating the elapsed time at the establishment of the near-field communication. The history information generated through such conversion from the history information accompanied with the timer information is transmitted as above. The conversion is performed by the use history information update unit 1000.

The use history information update unit 1000 performs the following conversion when the near-field communication between the terminal apparatus 101 and the mobile apparatus 102 is established. This conversion is performed on the basis of the time-of-day information stored in the time-of-day storage unit 223, the timer information from the timer 224, and the timer information accompanying the history information stored in the RAM (history region) 221. Here, the timer information accompanying the history information is converted into time-of-day information.

More specifically, the timer information according to the timer 224 is subtracted from the time-of-day information in the time-of-day storage unit 223, and the timer information accompanying the use history information is added thereto, so as to convert into time-of-day information with respect to each element of the use history information, thus to generate the use history information containing the time-of-day information as the information 802.

The use history information thus generated is transmitted to the mobile apparatus 102 through the near-field communication unit 107, and the terminal apparatus 101 finishes its operation including the timer 224, and turns the power off.

Figure 13:
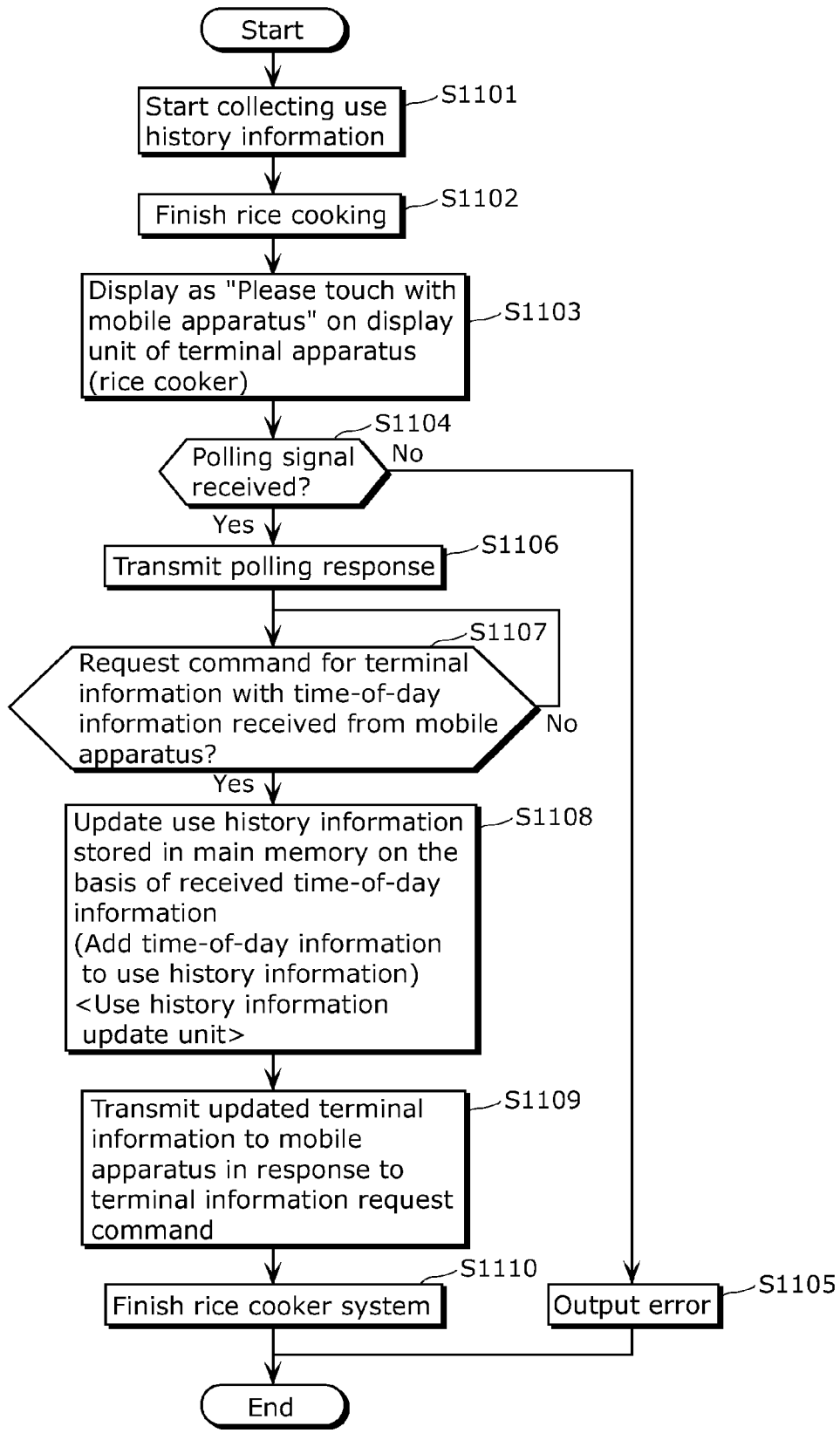
FIG. 13 is a flowchart showing an operation of the terminal apparatus according to the embodiment 3.

FIG. 13 is a flowchart showing an operation to collect the use history information performed by the terminal apparatus 101 according to this embodiment.

The terminal apparatus 101 is activated in accordance with a command inputted by the user through an operation unit such as the keypad 215.

At the same time as starting an operation in accordance with the inputted command, the terminal apparatus 101 activates the timer 224 so as to count the time. In addition, the terminal apparatus 101 causes the use history information generation unit 226 to generate the use history information and stores the generated use history information in the RAM (history region) 221 (S1101).

The use history information generation unit 226 generates the use history information, triggered by an input through the keypad 215 by the user, transition of the operation status of the controller 105 (for example, cooking phase to warmth retaining phase in a rice cooker), error detection, a change in information from a sensor (not shown), and so forth. Thus, the operation status information about the terminal apparatus 101 is generated as the history information in association with the timer information from the timer 224 at each of such time points. The collection of such use histories is continued until the terminal apparatus 101 finishes the operation and turns the power off.

Then the operation of the terminal apparatus 101, instructed through the keypad 215 or operation setting made by the user, is finished (S1102). The expression "finished" herein referred to means, for example in the case of a rice cooker, completion of a rice cooking job performed in accordance with an operation to start the rice cooking. In the case of a washing machine as another example, the "finish" means completion of a washing job based on an operation to start the washing job, or completion of a washing or drying job instructed by a washing or drying command.

Upon completion of an operation, the terminal apparatus 101 displays a message as "Please touch with mobile apparatus" on a display unit (not shown) of the terminal apparatus 101. Naturally, such notification may be made by an audible message or lighting up an LED instead of or in addition to the display on the display unit. Any notification method may be adopted, as long as the completion of operation of the terminal apparatus 101 can be notified to the user.

When the completion of the operation of the terminal apparatus 101 is notified, the user brings the mobile apparatus 102 close to the terminal apparatus 101. The terminal apparatus 101 checks whether the near-field communication unit 107 has received a polling signal from the mobile apparatus 102 (S1104).

In the case where a predetermined time has elapsed while the polling signal is not received (No at S1104), an error message (not shown) to the effect that the near-field communication has failed to be established is displayed on the display unit 110 of the mobile apparatus 102, and the process is finished (S1105).

On the contrary, in the case where the terminal apparatus 101 receives the polling signal from the mobile apparatus 102 (Yes at S1104), the terminal apparatus 101 transmits a polling response through the near-field communication unit 107 to thereby establish the near-field communication between the mobile apparatus 102 and the terminal apparatus 101 (S1106).

Then the terminal apparatus 101 waits for a terminal information request command accompanied with time-of-day information from the mobile apparatus 102 (No at S1107).

Upon receipt of the command accompanied with time-of-day information from the mobile apparatus 102 (Yes at S1107), the terminal apparatus 101 updates the use history information accompanied with the timer information stored in the RAM (history region) 221 of the main memory 106, on the basis of the received time-of-day information (S1108).

By this updating operation, the elapsed-time information accompanying the use history information stored in the RAM (history region) 221 is converted into time-of-day information, on the basis of the time-of-day information transmitted from the mobile apparatus 102 and indicating the time of day at which the near-field communication was established, and the elapsed-time information from the timer 224 at the time when the near-field communication was established.

The history information updated by the use history information update unit 1000 is transmitted to the mobile apparatus 102 as the terminal information, in response to the terminal information request command from the mobile apparatus 102 (S1109).

When the terminal information is transmitted at S1110, the operation of the system of the terminal apparatus 101 including the timer 224 is finished. The finish of the operation of the system includes turning off the power supplied to the terminal apparatus 101.

As described above, according to this embodiment the use history information containing the time-of-day information can be generated on the basis of the time-of-day information inputted from the mobile terminal upon bringing the mobile terminal close to the terminal apparatus 101 when the operation thereof is finished.

Embodiment 4

According to the embodiments 1 and 3, the time-of-day information is generated in the terminal apparatus 101 on the basis of the time-of-day information obtained through the near-field communication and the internally available timer information, and the history information containing the generated time-of-day information thus generated is generated.

This embodiment is different from the embodiments 1, 3 in the following aspects. The terminal apparatus 101 generates the history information accompanied only with the timer information and transmits such history information to the mobile apparatus 102 through the near-field communication. Then the mobile apparatus 102 converts the history information accompanied with the timer information received through the near-field communication into the history information containing the time-of-day information, and transmits the history information containing the time-of-day information converted as above to the server apparatus 104.

Figure 14:
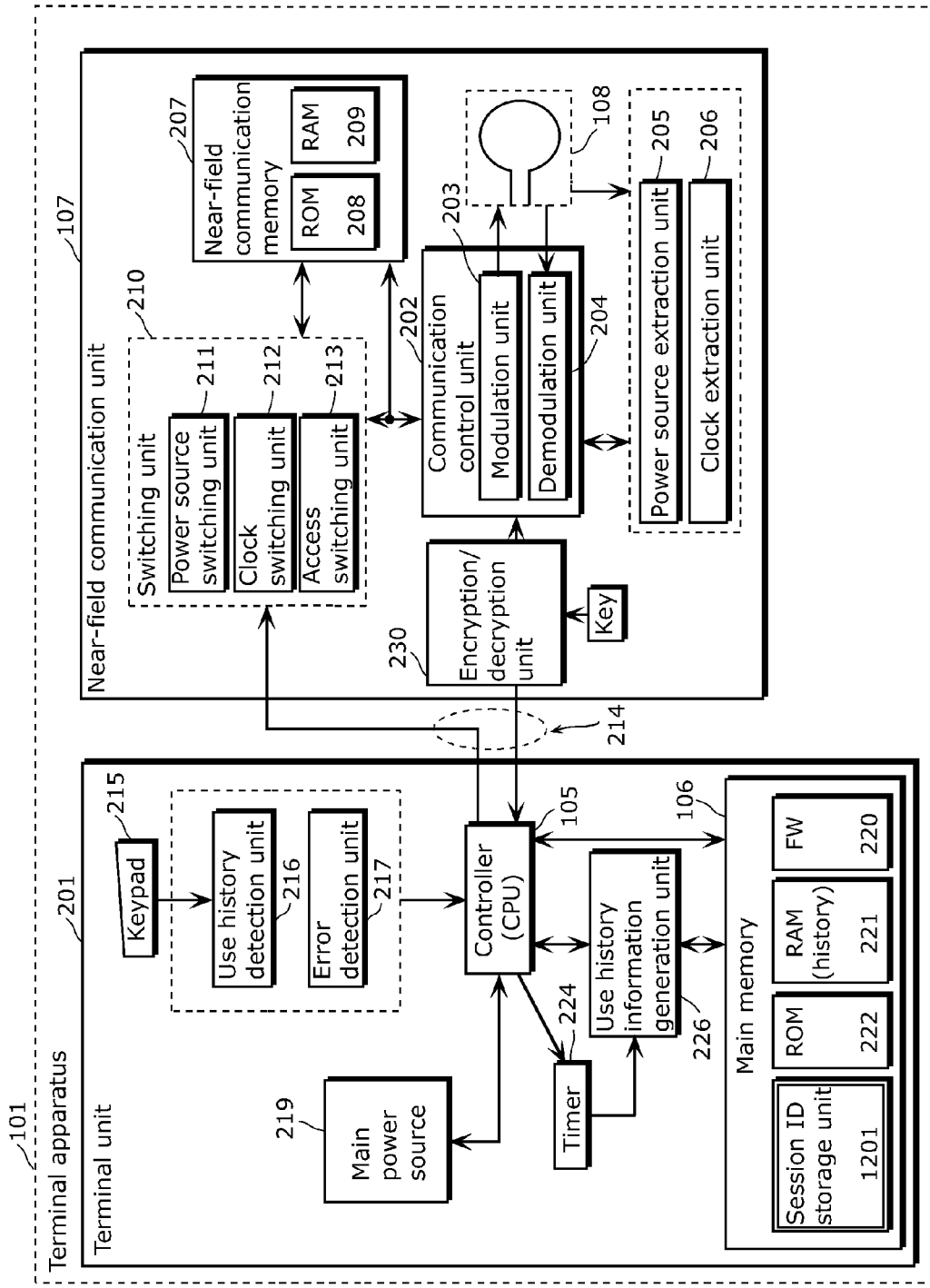
FIG. 14 is a block diagram showing a configuration of a terminal apparatus according to an embodiment 4 of the present invention.

FIG. 14 is a block diagram showing a configuration of the terminal apparatus 101 according to this embodiment.

According to this embodiment, as in the embodiments 1, 3, the use history information containing the time-of-day information is generated without providing a clock device in the terminal apparatus 101, and such information is provided to the server apparatus 104. However, unlike in the embodiments 1, 3, the addition of the time-of-day information to the use history information is performed by the mobile apparatus 102. Therefore, the terminal apparatus 101 according to this embodiment receives a session ID generated by the mobile apparatus 102 when the near-field communication is established, from the mobile apparatus 102 through the near-field communication, and stores the session ID in a session ID storage unit 1201 of the main memory 106.

Among the constituents of the terminal apparatus according to this embodiment shown in FIG. 14, the same ones as those of the embodiment 1 shown in FIG. 2 and the embodiment 3 shown in FIG. 12 are given the same numeral and detailed description thereof will not be repeated.

The embodiment 4 is different from the embodiments 1 and 3 in the connection arrangement of the timer 224 and the use history information generation unit 226, and in that the session ID storage unit 1201 is provided in the main memory 106.

Once the near-field communication is established between the near-field communication unit 107 of the terminal apparatus 101 and the mobile apparatus 102, the terminal apparatus 101 receives the session ID generated by the mobile apparatus 102 and stores the session ID in the session ID storage unit 1201 of the main memory 106, and also activates the timer 224.

The timer 224 has the function of counting elapsed time upon being activated, and when the session ID is received from the mobile apparatus 102 the timer 224 is activated and starts to count the elapsed time. The information of the elapsed time being counted is outputted to the use history information generation unit 226, in accordance with the request therefrom.

The use history information generation unit 226 outputs a request for the elapsed-time information, when the user inputs an instruction by operating the keypad 215, when the operation status of the controller changes, when an error is detected, and so forth. At the same time, the use history information generation unit 226 generates the operation status information as the history information and outputs the history information together with the elapsed-time information from the timer 224 to the RAM (history region) 221, which sequentially stores such information.

In addition, when the terminal apparatus 101 receives an output command for use history information from the mobile apparatus 102, the terminal apparatus 101 outputs the history information stored in the RAM (history region) 221 in association with the session ID stored in the session ID storage unit 1201, to the mobile apparatus 102.

Here, the history information outputted by the terminal apparatus 101 according to this embodiment is the same as the history information 801 shown in FIG. 9, but accompanied with the session ID.

The mobile apparatus 102 generates the session ID once the near-field communication with the terminal apparatus 101 is established, and stores the current time-of-day information in association with the generated session ID.

The mobile apparatus 102 also extracts, upon receipt of the history information accompanied with the session ID from the terminal apparatus 101, the session ID accompanying the received history information. At the same time, the mobile apparatus 102 extracts the time-of-day information corresponding to the received session ID, out of the time-of-day information stored in the mobile apparatus 102. Then the mobile apparatus 102 adds such time-of-day information to the elapsed-time information accompanying the history information, to thereby convert the elapsed-time information of the history information into the time-of-day information.

The mobile apparatus 102 can thus generate the history information containing the time-of-day information, and achieve the same advantageous effects as those of the embodiment 1.

An operation of the mobile apparatus 102 according to this embodiment will now be described.

Figure 15:
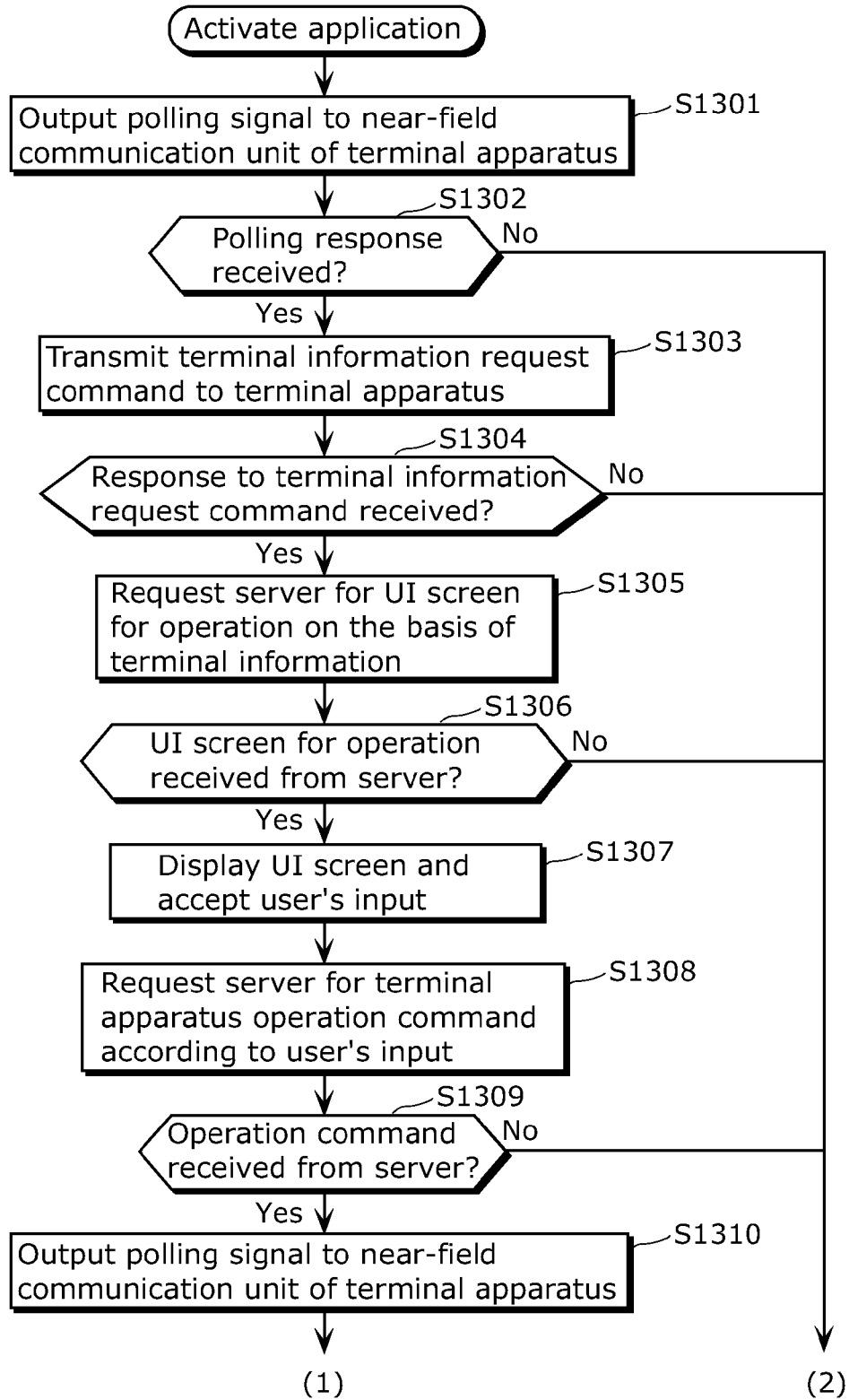
FIG. 15 is a flowchart showing an operation of a mobile apparatus according to the embodiment 4.
Figure 16:
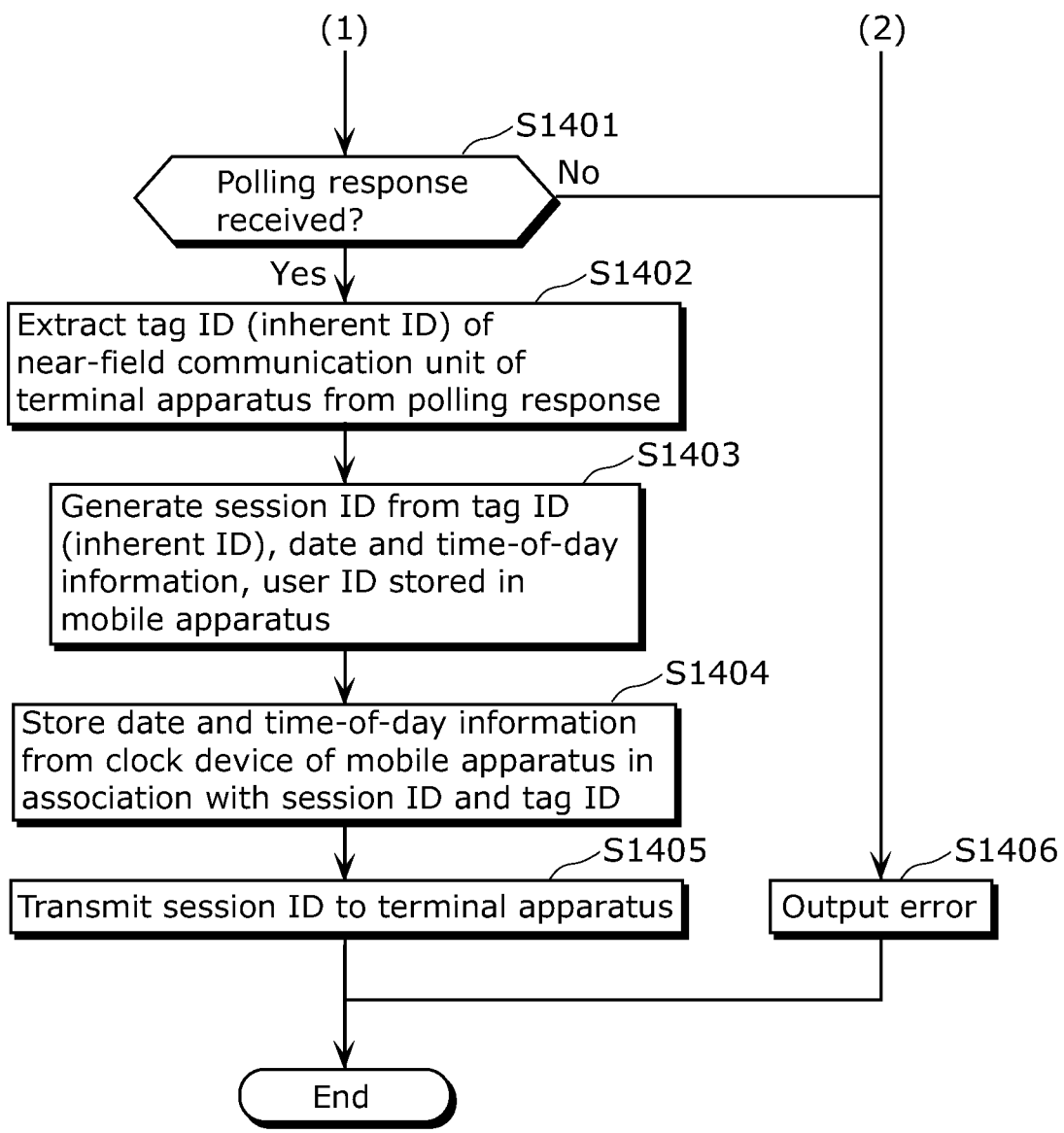
FIG. 16 is a flowchart showing the operation of the mobile apparatus that follows the operation shown in FIG. 15.

FIGS. 15 and 16 are flowcharts showing the operation of the mobile apparatus 102 according to this embodiment.

First, the user operates the mobile apparatus 102 so as to activate an application. Then the mobile apparatus 102 outputs a polling signal toward the near-field communication unit 107 of the terminal apparatus 101 (S1301).

Upon receipt of the polling signal outputted by the mobile apparatus 102, the terminal apparatus 101 outputs a polling response to the mobile apparatus 102, as a response to the polling signal.

The mobile apparatus 102 checks whether the polling response has been received from the terminal apparatus 101 (S1302). In the case where the polling response is not received (time out), the mobile apparatus 102 outputs an error message and finishes the process (S1406 in FIG. 16).

In the case where the receipt of the polling response is confirmed, the mobile apparatus 102 establishes the near-field communication with the terminal apparatus 101, and transmits a terminal information request command to the terminal apparatus 101 through the near-field communication now established with the terminal apparatus 101 (S1303).

After transmitting the request command to the terminal apparatus 101 at S1303, the mobile apparatus 102 checks whether the command response has been received from the terminal apparatus 101 (S1304). In the case where it is decided that the command response is not received (time out) the mobile apparatus 102 outputs an error message on the display unit 110 and suspends the process (S1406 in FIG. 16).

Once the command response is received, the mobile apparatus 102 requests the server apparatus 104 for UI information for the user interface screen to be operated by the user, on the basis of the received terminal apparatus information (S1305). The mobile apparatus 102 then checks whether the UI information has been received from the server apparatus 104 in response to the request for the information for the user interface screen (S1306). In the case where the UI information is not received from the server apparatus 104 (time out) the mobile apparatus 102 outputs an error message on the display unit 110 and suspends the process (S1406 in FIG. 16).

The mobile apparatus 102 then checks whether the UI information has been received from the server apparatus 104 in response to the request for the UI information (S1306). In the case where the UI information is not received from the server apparatus 104 (time out) the mobile apparatus 102 outputs an error message on the display unit 110 and suspends the process (S1406 in FIG. 16).

Upon receipt of the user interface screen information (UI information) from the server apparatus 104, the mobile apparatus 102 displays the user interface screen representing the received UI information on the display unit 110, so as to accept inputs by the user (S1307).

When the user makes an input, the mobile apparatus 102 requests the server apparatus 104 for an operation command for the terminal apparatus 101, in accordance with the operation of the user made on the user interface screen (S1308).

Then the mobile apparatus 102 checks whether a terminal command has been received in response to the request to the server apparatus 104 (S1309). In the case where the terminal command is not received (time out) the mobile apparatus 102 outputs an error message on the display unit 110 and suspends the process (S1406 in FIG. 16).

Once the terminal command is received from the server apparatus 104, the mobile apparatus 102 outputs a polling signal toward the near-field communication unit 107 of the mobile apparatus 102 (S1310). At the same time as outputting the polling signal, the mobile apparatus 102 displays on the display unit 110 a message urging the user to bring the mobile apparatus close to the terminal apparatus 101.

After outputting the polling signal, the mobile apparatus 102 checks whether the polling response has been received from the terminal apparatus 101 (S1401). In the case where the polling response is not received (time out) the mobile apparatus 102 outputs an error message on the display unit 110 and suspends the process.

Upon receipt of the polling response, the mobile apparatus 102 extracts a tag ID (inherent ID) of the near-field communication unit 107 of the terminal apparatus 101, out of the polling response (S1402). After extracting the tag ID of the terminal apparatus 101 with which the near-field communication has been established at S1402, the mobile apparatus 102 generates the session ID on the basis of the extracted tag ID and the user ID (contract number, telephone number, and so on) stored in the mobile apparatus 102 (S1403).

To generate the session ID, it is preferable to incorporate the combination of the user ID and the tag ID.

The session ID serves to verify the correspondence of parties in the currently established near-field communication as well as in the near-field communication to be subsequently established, and enables identification of who (which mobile apparatus) is performing the near-field communication with which terminal apparatus.

After generating the session ID at S1403, the mobile apparatus 102 extracts the date and the time-of-day information from the clock 112, and stores the extracted time-of-day information in association with the generated session ID and the tag ID, in the mobile apparatus 102 (S1404).

Then the mobile apparatus 102 stores the generated session ID in the session ID storage unit 1201 of the main memory 106 of the terminal apparatus 101, through the near-field communication currently established.

The process of storing the session ID is performed at the same time as outputting the terminal command received from the server apparatus 104. Upon receipt of the terminal command from the mobile apparatus 102, the terminal apparatus 101 starts the operation designated by the received terminal command, and performs that operation while generating the history information by the use history information generation unit 226.

Figure 17:
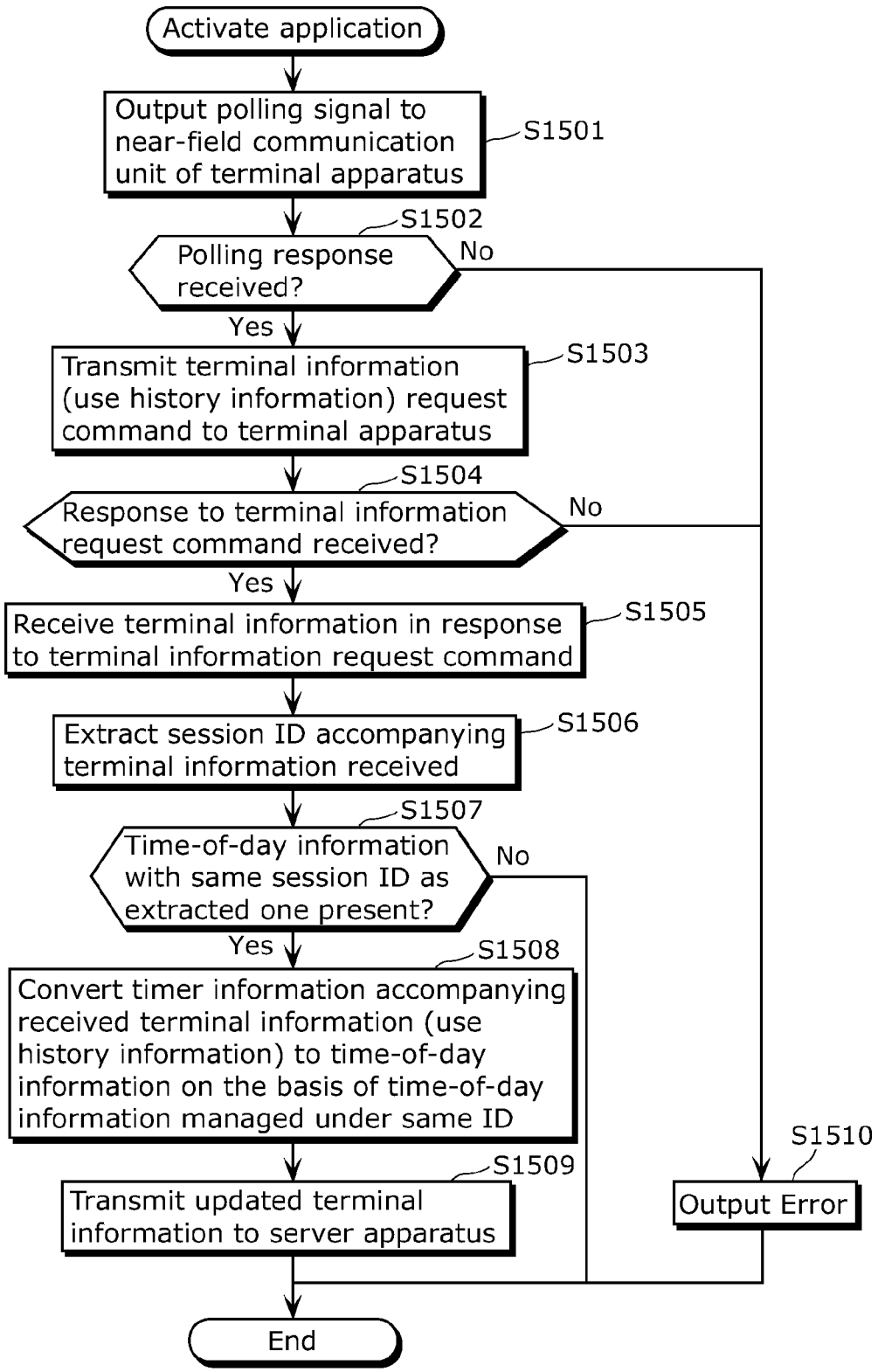
FIG. 17 is a flowchart showing another operation of a mobile apparatus according to the embodiment 4.

FIG. 17 is a flowchart showing an operation of the mobile apparatus 102 according to this embodiment for collecting the history information from the terminal apparatus 101.

Upon completion of an operation, the terminal apparatus 101 displays a message urging the user to bring the mobile apparatus 102 close to the terminal apparatus 101, on a display unit (not shown) of the terminal apparatus 101. The user activates an application of the mobile apparatus 102, and brings the mobile apparatus 102 close to the terminal apparatus 101.

When the application is activated by the operation of the user, the mobile apparatus 102 outputs a polling signal toward the near-field communication unit 107 of the terminal apparatus 101 (S1501).

The mobile apparatus 102 checks whether the polling response has been received from the terminal apparatus 101 (S1502). In the case where the polling response is not received (time out), the mobile apparatus 102 outputs an error message on the display unit 110 and suspends the process (S1510).

In the case where the polling response is received, the mobile apparatus 102 transmits a request command for terminal information, specifically for use history information, to the terminal apparatus 101 (S1503).

After transmitting the request command to the terminal apparatus 101 at S1503, the mobile apparatus 102 checks whether the response signal to the transmitted request command has been received (S1504). In the case where the response is not received (time out) the mobile apparatus 102 outputs an error message on the display unit 110 and suspends the process (S1510).

In the case where the response signal is received, the mobile apparatus 102 receives the terminal information in response to the request command (S1505).

The mobile apparatus 102 then extracts the session ID accompanying the received terminal information (S1506).

The mobile apparatus 102 decides whether the time-of-day information accompanied with the same session ID as the one extracted at S1506 is present in the storage device in the mobile apparatus 102 (S1507).

The time-of-day information accompanied with the session ID stored in the storage device in the mobile apparatus 102 is the time-of-day information stored at S1404. In the case where the same session ID as the received one is not found in the memory in the mobile apparatus 102, the mobile apparatus 102 suspends the process (No at S1607).

In the case where the time-of-day information accompanied with the same session ID as the received one is contained in the memory of the mobile apparatus 102, the mobile apparatus 102 converts the timer information (elapsed-time information) accompanying the received terminal information to time-of-day information on the basis of the time-of-day information managed under the same session ID, thus updating the terminal information with the timer information to terminal information containing the time-of-day information (S1508). In this updating process, the time-of-day information stored with the same session ID is added to each piece of elapsed-time information in the terminal information, so as to convert each piece of elapsed-time information into time-of-day information.

After updating the terminal information, the mobile apparatus 102 transmits the updated terminal information to the server apparatus 104, and finishes the process.

As described above, with the terminal apparatus 101 and the mobile apparatus 102 according to this embodiment, the mobile apparatus 102 can receive the use history information accompanied with the timer information generated by the terminal apparatus 101 which is not provided with a clock, convert the timer information accompanying the use history information into the time-of-day information, and transmit the information to the server apparatus 104. Such a configuration enables the use history information containing the time-of-day information to be generated without the need to incorporate an expensive clock device in the terminal apparatus 101, and to be transmitted to the server apparatus 104. Accordingly, the server apparatus 104 can analyze the user's life pattern, to thereby provide user support information that closely fits the user's life pattern.

The mobile apparatus 102 generates the session ID for establishing the correspondence between the use history information generated by the terminal apparatus 101 and the time-of-day information managed in the mobile apparatus 102. The time-of-day information is stored in association with the generated session ID, and the generated session ID is transmitted to the terminal apparatus 101. Accordingly, the terminal apparatus 101 can generate the use history information in association with the session ID and transmit such use history information to the mobile apparatus 102, thus to secure the correspondence between the use history information transmitted from the terminal apparatus 101 and the time-of-day information stored in the mobile apparatus 102.

Although the embodiments 1 to 4 exemplify the case where the terminal apparatus 101 and the mobile apparatus 102 perform the near-field communication in the RFID or NFC format, the communication method is not limited thereto. On the assumption that the mobile apparatus 102 is a remote controller of an air conditioner, the transmission of the time-of-day information may be realized by infrared communication. In this case, activating the timer 224 when the terminal apparatus 101 accepts the command transmitted by infrared communication leads to the generation of the history information containing the time-of-day information, which is a feature of the present invention. The history information thus generated may be transmitted to the mobile apparatus 102 by infrared communication, or by wireless communication such as near-field communication, wireless LAN, or Bluetooth (registered trademark) communication, or through a physically connected communication line.

According to the present invention, the time-of-day information subsequent to the time point where the communication was established is set in home electric appliances not provided with a clock device (microwave oven, cleaner, washing machine, etc.), from a mobile apparatus having a clock device (mobile phone, PDA, PC, etc.) through a communication line (near-field communication, RFID, NFC, Bluetooth (registered trademark), etc.). When such setting is done, the timer provided in the home electric appliance is activated, so as to generate the time-of-day information by combining the time-of-day information that has been set and the timer information, and to generate the use history information containing the generated time-of-day information, and such use history information is transmitted to the mobile apparatus by the foregoing communication method. The above constitutes a primary feature of the technique according to the present invention. Collecting the use history information containing the time-of-day information and analyzing the same allows presumption of when and which function the user utilized, thereby enabling advisory information that closely fits the user's life pattern to be provided.

Now, for example the following operation may be performed. In other words, the following operation may be performed depending on the circumstances.

The terminal apparatus (see FIGS. 1, 2) may be a rice cooker, a washing machine, and so forth.

The current time of day may be recognized in the terminal apparatus (see description above).

However, if a clock device, such as a radio-controlled clock were incorporated in the terminal apparatus in order to recognize the current time of day, the cost of the terminal apparatus would increase.

As a remedy to overcome such a drawback, the near-field communication such as the NFC format has been focused on, which has recently come to be widely used, for example for payment by electronic money at stores, and for automatic ticket gates at railway stations, where passengers carry a communication device to be made to touch the gate.

More specifically, all that is necessary is preparing a contactless electronic tag if it suffices that such near-field communication can be performed (see PTL 2).

Moreover, these days many of the users who utilize the terminal apparatuses are familiar with the communication devices such as the mobile phone and the smartphone (see mobile apparatus 102 in FIG. 1).

The communication devices such as the mobile phone are also capable of performing the near-field communication.

In addition, most of the communication devices such as the mobile phone have the clock function to generate information indicating the current time of day.

Accordingly, the near-field communication may be performed between the terminal apparatus and the communication device, such as the communication card made to touch the terminal apparatus (see near-field communication unit 107 in FIG. 2).

Then the information indicating the current time of day (time-of-day information described above) generated by the communication device may be acquired from the communication device, through the near-field communication, so that the current time of day may be identified in the terminal apparatus on the basis of the acquired information (see controller 105).

Such an arrangement enables the current time of day to be identified while suppressing an increase in cost, thus achieving both the low cost and the function to identify the current time of day.

However, in some terminal apparatuses a timer is provided for measuring the length of time from the time of day at which the time measurement is started up to the current time of day (see timer 224 in FIG. 2).

For example, a rice cooker may be provided with a timer for measuring the duration of the rice cooking operation, and a washing machine may also have a timer for measuring the duration of the washing or drying operation.

This leads to the understanding that providing such a timer in the terminal apparatus and utilizing the timer to measure the length of time up to the current time of day does not incur an increase in cost, and the cost can be maintained low.

It is also understood that the time of day to be identified by the terminal apparatus is not only the time of day at which the communication device is made to touch so as to perform the near-field communication, but also may be a time of day at which the communication device is not made to touch and hence the near-field communication is not performed (see description above).

Therefore, with the terminal apparatus, the near-field communication may be performed with the communication device (see mobile apparatus 102 in FIG. 1) at another time of day different from a second time of day which is the current time of day (see near-field communication unit 107 in FIG. 2).

Then the information generated by the communication device (mobile apparatus 102) may be acquired through the near-field communication performed at another time of day (see controller 105).

In addition, the information to be acquired may be the information indicating a first time of day generated by the communication device at the first time of day, at which the length of time between the first time of day and the second time of day is measured.

Here, for example, the communication device may be controlled so as to generate the information at the first time of day at which the time measurement is started, and such information indicating the first time of day (hour, minute, second) may be acquired (see description above).

Then the length of time from the first time of day to the second time of day may be measured (see timer 224 in FIG. 2).

Further, the time of day later than the first time of day indicated by the acquired information by the length of time that has been measured may be identified as the second time of day which is the current time of day (see time-of-day generation unit 225).

For the foregoing arrangement merely the timer is employed, and therefore an increase in cost can be suppressed. Further, the current time of day can be identified even when the near-field communication is not performed at the current time of day, which further assures that the current time of day can be obtained. Therefore, both the low cost and the function to identify the current time of day can be achieved.

Additional Embodiments

The embodiments 1 to 4 represent the method to generate the apparatus information accompanied with the time-of-day information, from a home electric appliance not provided with a clock function. Hereunder, additional embodiments that may be realized by extending the method according to the embodiments 1 to 4 will be described.

Figure 18:
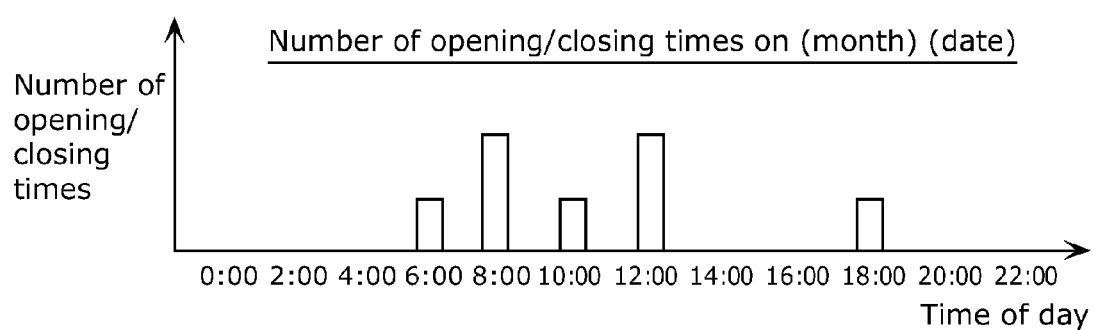
FIG. 18 is a graph for explaining an additional embodiment of the present invention.

FIG. 18 is a graph showing the number of opening/closing times of a refrigerator door obtained by applying the present invention.

Many of the refrigerators are not provided with a clock function, though the timer function is normally provided. However, it is desirable that the number of opening/closing times of the door at different times of the day be displayed, so as to adjust to the user's life pattern.

In this embodiment, accordingly, the time-of-day information that can be acquired from the clock 112 of the mobile apparatus 102 upon making the mobile apparatus 102 touch the terminal apparatus 101, which is the refrigerator, was set in the terminal apparatus 101, and a graph showing the number of opening/closing times of each time of day was generated, as shown in FIG. 18.

Actually, the terminal apparatus 101 calculated the time-of-day information corresponding to the opening/closing action by combining (adding) the time-of-day information provided from the mobile apparatus 102 and the internal timer 224. Then the number of opening/closing times was added up at each time of day, and the added values were accumulated in the main memory 106 or the near-field communication memory 207. The information of the accumulated values of the opening/closing times thus obtained corresponds to the use history information according to the embodiments 1 to 3.

The use history information is accumulated in either the main memory 106 or the near-field communication memory 207.

Since the main memory 106 normally has a larger storage capacity than the near-field communication memory 207, a relatively large amount of use history information can be accumulated. However, the use history information stored in the main memory 106 cannot be read out by the mobile apparatus 102, unless power is being supplied from the main power source 219 of the terminal unit 201.

In contrast, in the case where the use history information is accumulated in the near-field communication memory 207, even when the power from the main power source 219 of the terminal unit 201 is not supplied the use history information stored in the near-field communication memory 207 can be read out by the mobile apparatus 102, though the amount of data that can be accumulated in the near-field communication memory 207 is normally smaller than in the main memory 106.

Accordingly, it is preferable to determine which of those storage units to use depending on the nature and amount of the use history information to be accumulated, under the control of the controller 105.

In addition, in the case where the use history information is the number of opening/closing times as in this embodiment, it is preferable to add up the number of opening/closing times in the terminal unit 201 by a predetermined time unit, unlike the use history information with respect to each transition of the operation as the information 802 shown in FIG. 9, and to store the aggregated values obtained through such addition.

The foregoing arrangement enables the amount of the use history information in the terminal apparatus 101 to be compressed, and allows the graph as shown in FIG. 18 to be made up without processing the use history information in the mobile apparatus 102 or the server apparatus 104.

In the case of the refrigerator, it is preferable to generate the use history information by adding up the number of opening/closing times by the day and by the hour.

Such an arrangement enables a graph showing the number of opening/closing times of, for example, the last one week to be made up, by a single touch of the mobile apparatus 102. In the case where the refrigerator has a plurality of doors, the number of opening/closing times may be added up with respect to each door, so that the graph showing the number of opening/closing times can be obtained with respect to each door.

The time-of-day information may be set in the terminal apparatus 101 from the mobile apparatus 102, each time the user makes the mobile apparatus 102 touch the terminal apparatus 101. Alternatively, the time-of-day information may be set in the terminal apparatus 101 when a predetermined amount of deviation is produced between the time-of-day information calculated by the time-of-day generation unit 225 of the terminal apparatus 101 and the time-of-day information according to the clock 112 of the mobile apparatus 102.

Although it is assumed that the terminal apparatus 101 is not provided with a clock function in the embodiments 1 to 4, the present invention is applicable to different situations. For example, the present invention is also applicable in the case where the timer 224 of the terminal unit 201 is a clock, as some health care products such as a pedometer and a weighing scale.

Generally, the clock provided in the terminal unit 201 cannot be automatically adjusted once the user adjusts the time of day. Accordingly, readjustment is only performed when the user finds at a later time that the clock of the terminal unit 201 is wrong. In addition, in the case of battery-driven apparatuses such as the healthcare apparatus, the clock is prone to go wrong or return to the initial value when the battery level becomes low. Therefore, if the user should fail to notice the deviation of the clock of the terminal apparatus 101, vital information, a typical example of the use history information of a healthcare apparatus, may be generated on the basis of wrong times of the day.

Applying the present invention to such a case enables the correct time-of-day information from the mobile apparatus 102 to be set in the terminal apparatus 101. The terminal apparatus 101 such as a mobile phone is receiving the correct time of day from a base station, so as to constantly maintain the correct time of day. Therefore, upon making the mobile apparatus 102 touch the terminal apparatus 101, the correct time-of-day information of the mobile apparatus 102 can be set in the terminal apparatus 101.

The terminal apparatus 101 capable of readjusting the internal clock as above can be realized by providing a time-of-day correction unit that corrects the time of day indicated by the internal clock on the basis of the time-of-day information provided by the mobile apparatus 102 to be set in the terminal apparatus 101. The time-of-day correction unit can be realized by utilizing the techniques disclosed in the embodiments 1 to 4 for resetting the timer 224 or setting the initial time-of-day information, on the basis of the time-of-day information provided by the mobile apparatus 102 to be set in the terminal apparatus 101.

The present invention may be realized not only as the foregoing device, but also as a method including the operations performed by the constituents of the device, or as a program that causes a computer to execute those operations. Such a program may be realized as a computer-readable recording medium such as CD-ROM, or as information, data, or a signal representing the program. Further, the program, the information, the data, and the signal may be distributed through a communication network such as Internet.

INDUSTRIAL APPLICABILITY

The communication device and the communication method according to the present invention are usefully applicable to home electric appliances capable of generating a use history accompanied with time-of-day information, but not provided with a clock function, for collecting the use history information.

REFERENCE SIGNS LIST

100 General system
101 Terminal apparatus
102 Mobile apparatus
103 Internet
104 Server apparatus
108, 109 Loop antenna
110 Display unit
111 Operation section (keypad)
112 Clock
701, 702, 703, 704 Display screen of mobile apparatus 711 Regular user registration button
712 Rice cooking start button
801, 802 Information

The invention claimed is:

1. A communication device that communicates with an external reader-writer apparatus, the communication device comprising:
a timer unit configured to generate timer information;
a near-field communication unit configured to receive time-of-day information from the reader-writer apparatus through near-field communication;
a use history information generation unit configured to detect operation information of the communication device, and generate use history information on the basis of the time-of-day information received by the near-field communication unit and the timer information, the use history information including operation time-of-day information associated with the detected operation information and indicating the time of day at which the corresponding operation was performed; and
a storage unit configured to store the use history information generated by the use history information generation unit,
wherein the near-field communication unit is configured to:
receive a polling signal from the reader-writer apparatus;
transmit a polling response to the reader-writer apparatus to thereby establish the near-field communication; and
receive the time-of-day information from the reader-writer apparatus through the established near-field communication.

2. The communication device according to claim 1, wherein the near-field communication unit is configured to transmit the use history information stored in the storage unit to the reader-writer apparatus, upon receipt of an acquisition request from the reader-writer apparatus.

3. The communication device according to claim 1, wherein the timer unit is configured to be activated after receiving the time-of-day information from the reader-writer apparatus.

4. The communication device according to claim 1, wherein the timer unit is configured to be reset after receiving the time-of-day information from the reader-writer apparatus.

5. The communication device according to claim 1, wherein the time-of-day information indicates a time of day after the near-field communication unit and the reader-writer apparatus establish communication with each other.

6. The communication device according to claim 1, wherein the use history information generation unit is configured to generate the use history information on the basis of the time-of-day information and the timer information, at a time point when an operation status of the communication device changes, and store the use history information in the storage unit.

7. The communication device according to claim 1, wherein the use history information generation unit is configured to generate the use history information on the basis of the time-of-day information and the timer information, at a time point when an operation error of the communication device is outputted, and store the use history information in the storage unit.

8. The communication device according to claim 1, further comprising
an operation unit,
wherein the communication device generates the use history information on the basis of the time-of-day information and the timer information, at a time point when an operation of the communication device is performed through the operation unit, and store the use history information in the storage unit.

9. A communication method performed between a communication device and an external reader-writer apparatus, the communication method comprising:
generating timer information;
receiving time-of-day information from the external reader-writer apparatus through near-field communication;
detecting operation information of the communication device and generating use history information on the basis of the time-of-day information received in the receiving of time-of-day information and the timer information, the use history information including operation time-of-day information associated with the detected operation information and indicating the time of day at which the corresponding operation was performed; and
storing the use history information generated in the generating of use history information;
wherein said receiving comprises:
receiving a polling signal from the reader-writer apparatus;
transmitting a polling response to the reader-writer apparatus to thereby establish the near-field communication; and
receiving the time-of-day information from the reader-writer apparatus through the established near-field communication.

10. A communication device including a reader-writer that communicates with a terminal apparatus through near-field communication, the communication device comprising:
a near-field communication establishment unit configured to transmit a polling signal to the terminal apparatus and receive a signal in response to the polling signal to thereby establish the near-field communication with the terminal apparatus;
a session ID generation unit configured to generate a session ID for managing a session of the near-field communication;
a time-of-day information extraction unit configured to extract time-of-day information from a clock device in the communication device after the near-field communication establishment unit establishes the near-field communication;
a time-of-day storage unit configured to store the time-of-day information extracted by the time-of-day information extraction unit, in association with the session ID;
a session ID transmission unit configured to transmit the session ID to the terminal apparatus through the near-field communication established by the near-field communication unit;
a terminal information reception unit configured to receive operation status information of the terminal apparatus through the near-field communication, the operation status information being accompanied with timer information; and
a terminal information update unit configured to (i) extract the time-of-day information stored in the time-of-day storage unit, on the basis of the session ID attached to the operation status information of the terminal apparatus accompanied with the timer information, and (ii) update the timer information accompanying the operation status information of the terminal apparatus to operation time-of-day information, on the basis of the extracted time-of-day information.

11. A communication method performed by a communication device including a reader-writer that communicates with a terminal apparatus through near-field communication, the communication method comprising:

transmitting a polling signal to the terminal apparatus and receiving a signal in response to the polling signal, thereby establishing the near-field communication with the terminal apparatus;

generating a session ID for managing a session of the near-field communication;

extracting time-of-day information from a clock device in the communication device after the establishing of the near-field communication;

storing the time-of-day information extracted in the extracting of time-of-day information, in association with the session ID;

transmitting the session ID to the terminal apparatus through the near-field communication established in the establishing of the near-field communication;

receiving operation status information of the terminal apparatus through the near-field communication, the operation status information being accompanied with timer information;

extracting the time-of-day information stored in the storing of the time-of-day information, on the basis of the session ID attached to the operation status information of the terminal apparatus accompanied with the timer information; and updating the timer information accompanying the operation status information of the terminal apparatus to operation time-of-day information, on the basis of the extracted time-of-day information.

\* \* \* \* \*